(12) United States Patent
Hamano et al.

(10) Patent No.: US 6,307,641 B1
(45) Date of Patent: *Oct. 23, 2001

(54) IMAGE INFORMATION RETRIEVING DEVICE, IMAGE DATABASE DEVICE, IMAGE INFORMATION STORING DEVICE AND RECORDING MEDIUM ON WHICH A PROGRAM PERFORMED BY THE IMAGE INFORMATION RETRIEVING DEVICE IS RECORDED

(75) Inventors: Teruo Hamano; Ken Kajii, both of Yokohama; Tsutomu Sasaki, Nagoya; Noboru Sonehara, Zushi, all of (JP)

(73) Assignee: Nippon Telegraph and Telephone Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,944

(22) Filed: Oct. 15, 1997

(30) Foreign Application Priority Data

| Oct. 21, 1996 | (JP) | 8-277732 |
| Oct. 31, 1996 | (JP) | 8-289676 |
| Dec. 11, 1996 | (JP) | 8-330961 |
| Dec. 11, 1996 | (JP) | 8-330962 |
| Dec. 11, 1996 | (JP) | 8-330963 |
| Feb. 28, 1997 | (JP) | 9-046173 |

(51) Int. Cl.$^7$ .............................. H04M 11/00; H04N 1/00
(52) U.S. Cl. .................... 358/1.15; 358/403; 379/88.13; 709/206
(58) Field of Search .................................... 358/402, 403, 358/407; 379/88.01, 88.07, 88.08, 88.13, 88.17, 88.25, 88.27, 100.08, 100.11, 905; 709/206, 217, 219; 395/114

(56) References Cited

U.S. PATENT DOCUMENTS 5,068,888 * 11/1991 Scherk et al. .................... 379/100.11

(List continued on next page.)

FOREIGN PATENT DOCUMENTS 0 762 729 A2 * 3/1997 (EP) .

*Primary Examiner*—Edward Coles
*Assistant Examiner*—Joseph R. Pokrzywa
(74) *Attorney, Agent, or Firm*—Pennie & Edmonds LLP

(57) ABSTRACT

An image information retrieving device comprises: a primary service control information storing section in which primary service control information is stored in advance; a response section which performs between a facsimile terminal which is connected to a line, output of guidance information in accordance with a service control procedure indicated by primary service control information stored in the primary service control information storing section, input of an assignment signal from a user based on the guidance information, and output of image information as a retrieval result based on the assignment signal; a retrieval processing section which retrieves image information from an image information storing device in response to the operation of the response section, reads the image information as the retrieval result, and outputs the image information to the response section; a secondary service control information storing section for storing temporarily secondary service control information showing a service control procedure which is stored together with the image information in the image information storing device and following on from the service control procedure shown by the primary service control information stored in the primary service control information storing section; and a control section in the response section, which directs the retrieval processing section to read the secondary service control information from the image information storing device and store this in the secondary service control information storing section at the time of input of the assignment signal, and performs control for outputting the guidance information to the facsimile terminal in accordance with the service control procedure indicated by the stored secondary service control information.

11 Claims, 24 Drawing Sheets

U.S. PATENT DOCUMENTS

| | | | | |
|---|---|---|---|---|
| 5,136,634 | * | 8/1992 | Rae et al. | 379/100 |
| 5,235,680 | * | 8/1993 | Bijnagte | 395/161 |
| 5,341,222 | * | 8/1994 | Newman et al. | 358/403 |
| 5,555,343 | * | 9/1996 | Luther | 704/260 |
| 5,717,493 | * | 2/1998 | Ozawa et al. | 358/403 |
| 5,732,216 | * | 3/1998 | Logan et al. | 709/203 |
| 5,739,918 | * | 4/1998 | Ouchi | 358/403 |
| 5,799,063 | * | 8/1998 | Krane | 379/88.17 |
| 5,844,691 | * | 12/1998 | Nishiyama et al. | 358/434 |
| 5,848,378 | * | 12/1998 | Shelton et al. | 702/3 |
| 5,884,262 | * | 3/1999 | Wise et al. | 704/270 |
| 5,915,001 | * | 6/1999 | Uppaluru | 379/88.22 |
| 5,953,392 | * | 9/1999 | Rhie et al. | 379/88.13 |
| 6,199,076 | * | 3/2001 | Logan et al. | 707/501 |

* cited by examiner

FIG. 2A

Primary service control information

| | |
|---|---|
| Voice information A | "This is XXXX facsimile information service.<br>For weather information, press 1#,<br>for traffic information, press 2#,<br>and for other information, press 3#." |
| Execution information A | 1# → Load secondary service control information stored in storage address .<br>2# → Load secondary service control information stored in storage address .<br>3# → Transmit voice information B to facsimile terminal. |
| Voice information B | " ............ " |
| Execution information B | |

Order of execution →

FIG. 2B

Secondary service control information

| | |
|---|---|
| Voice information A' | "This is weather information service.<br>For weather information in Kanto area, press 1#,<br>for weather information in Tokai area, press 2#." |
| Execution information A': | 1# → Output image information stored in storage address .<br>2# → Output image information stored in storage address . |

Order of execution →

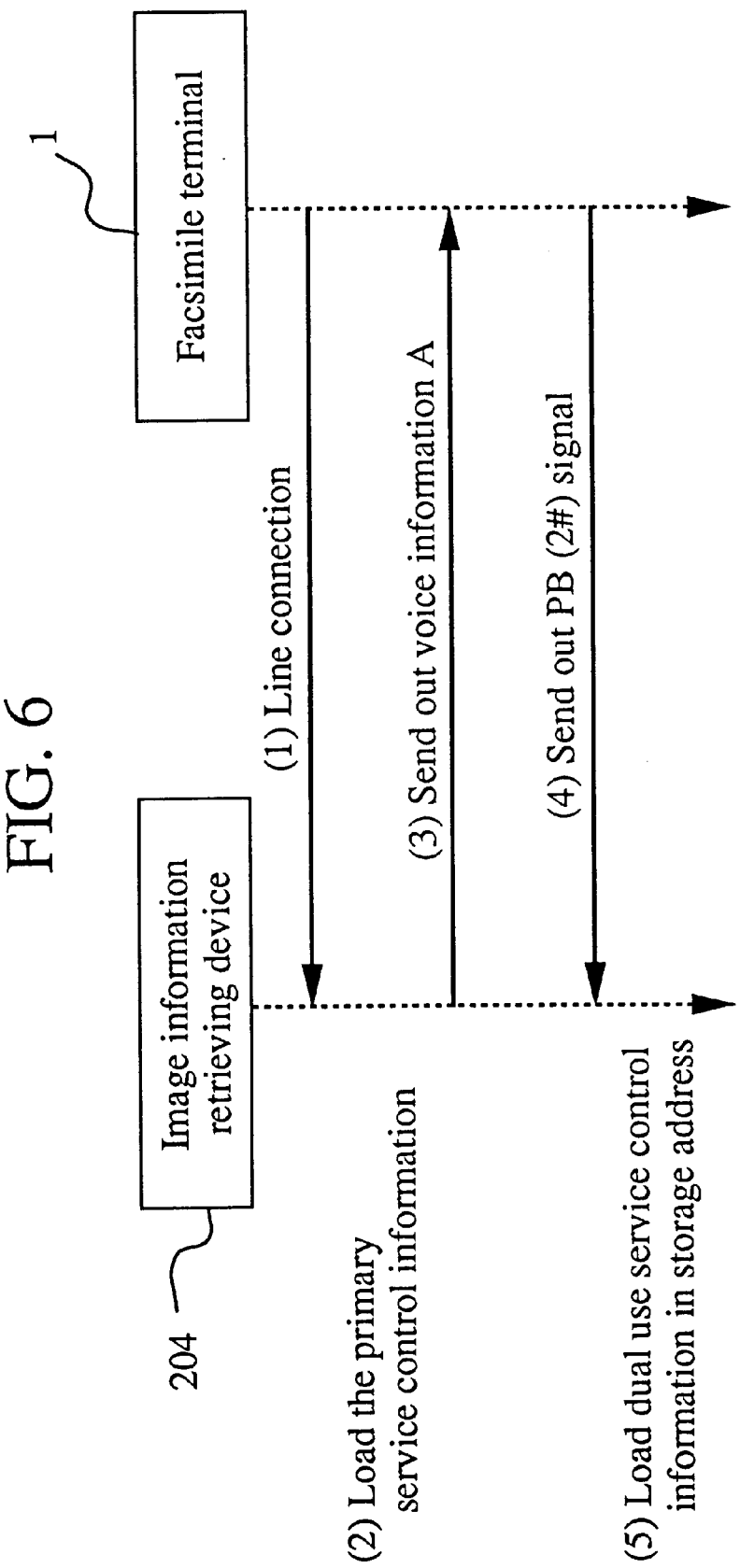

FIG. 7

| | |
|---|---|
| Voice information A | "For desired price of from 0 to 100,000 Yen, press 1#, for desired price of from 110,000 to 200,000 Yen, press 2#, and for desired price of from 210,000 to 500,000 Yen, press 3#." |
| Execution information A | If PB number is 1#, retrieval condition A is 0 ~ 100,000 Yen. If PB number is 2#, retrieval condition A is 110,000 ~ 200,000 Yen. If PB number is 2#, retrieval condition A is 210,000 ~ 500,000 Yen. |
| Voice information B | "For sedan, press 1#, for wagon, press 2#, and for one box, press 3#. |
| Execution information B | If PB number is 1#, retrieval condition B is sedan. If PB number is 2#, retrieval condition B is wagon. If PB number is 3#, retrieval condition B is one box. |
| Voice information C | "If retrieval is to be executed, press 1#, and if not, press 2#." |
| Execution information A | If PB number is 1, transmit the retrieval condition information composed of retrieval condition A and retrieval condition B to the data storing and processing device. If PB number is 2,.... |

Order of execution →

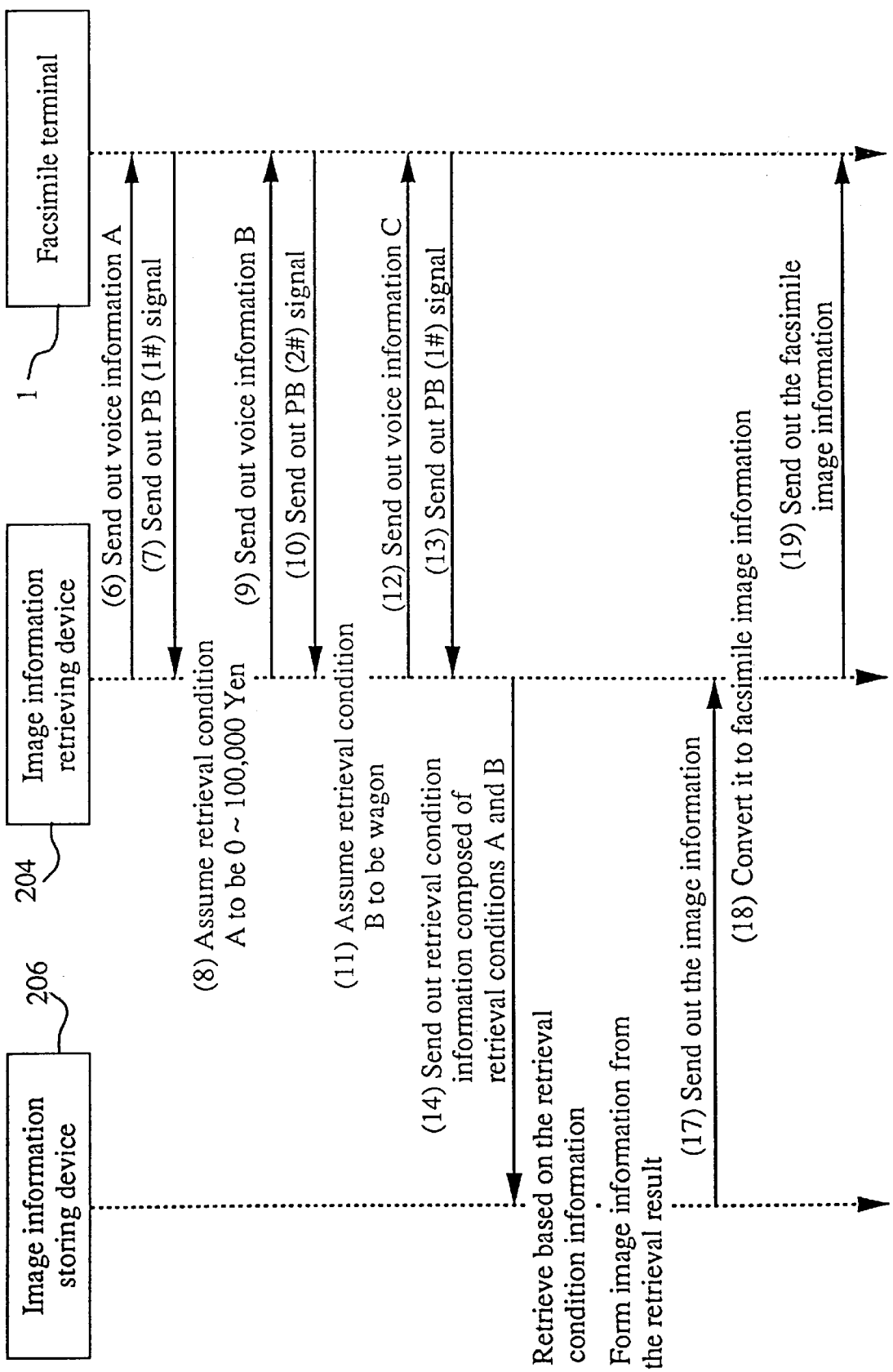

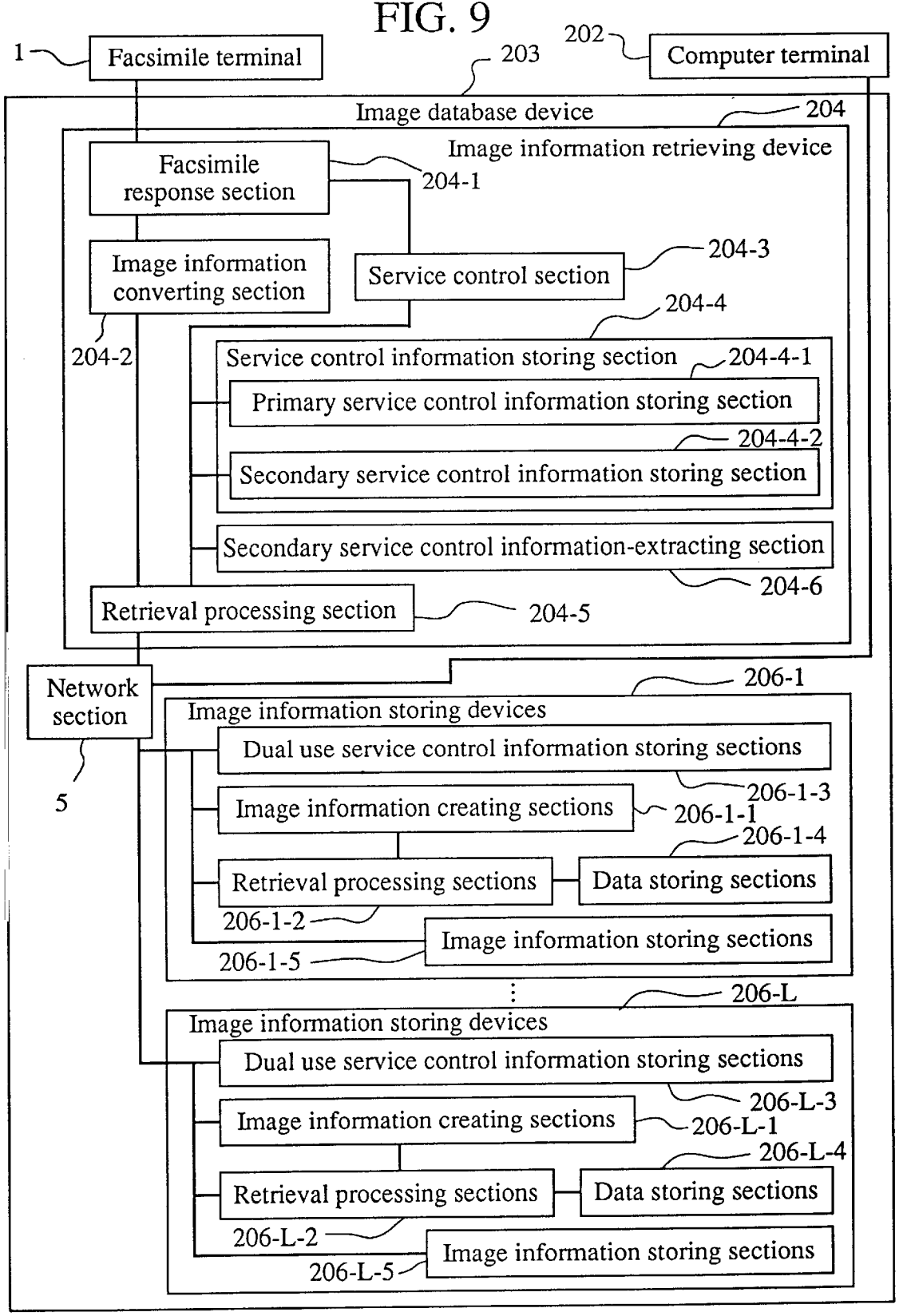

FIG. 12

```
<HTML>
<HEAD>
<TITLE> Neorux Home Page</TITLE>
</HEAD>
<BODY>
<center>
<image src="NeoruxLogo.gil: alt="Neorux Home Page">
<H2>Welcome to Neorux Home Page</H2>
</center>
...
<SCRIPT LANGUAGE = "FAXSCRIPT">
<!CONTENT TYPE = World Wide Web : HTML: HTML editor :
"How to use Kajii's HTML editor"::
   .....(service control script)...
   .....(service control script)...
   .....(service control script)...
  >image label information
  Content type shows that it is image label information.
  Columns on the right hand side mean finer classification than the
left column.  ":" is put between classification groups.  The title is
shown in " ".
    :: means termination.
</BODY>
</HTML>
```

FIG. 13A

Primary service control information

| | |
|---|---|
| Voice guidance information A | "This is XXX facsimile information service. For directory service, press 1#, For number address, press 2#, and for other information, press 3#." |
| Execution information A | 1#→ Retrieve image information stored in storage position .<br>2#→ Retrieve image information stored in storage position .<br>3#→ Transmit storage information to a facsimile |
| Voice guidance information 1# | "This is directory service. For local information, press 1#, for corporate information, press 2#, for computer information, press 3#, for magazine and book information, press 4#, for World Wide Web information, press 5#, ..." |
| Execution information 1# | Retrieve image information corresponding to respective numbers |

This guidance menu portion is formed and updated based on the directory information formed by the directory information creating and storing section.

FIG. 13B

Secondary service control information

| | |
|---|---|
| Voice guidance information A' | "This is [How to use Kajii's HTML editor] service. For summary information, press 1#, For full manual information, press 2#." |
| Execution information A' | 1#→ Transmit image information stored in storage position .<br>2#→ Transmit image information stored in storage position . |

FIG. 17A
Primary service control information

Order of execution ↓

| Voice guidance information A | A (Voice information identification symbol) |
|---|---|
| Execution information A | 1# → Load secondary service control information stored in storage position .<br>2# → Load secondary service control information stored in storage position .<br>3# → Transmit voice information B to a facsimile terminal. |
| Voice information B | B |
| Execution information B | |

FIG. 17B
Secondary service control information

Order of execution ↓

| Voice guidance information A' | C, D, E, "of Kanto area" (text information for voice synthesis), F, G (voice information identification symbol), "of Tokai area", F, H |
|---|---|
| Execution information A' | 1# → Output image information stored in storage position to a facsimile terminal.<br>2# → Output image information stored in storage position to a facsimile terminal. |

FIG. 17C
Voice information storing section

| Identification symbol | Voice information |
|---|---|
| A | "This is XXX facsimile information service. For weather information, press 1#, for traffic information, press 2#, and for other information, press 3#." |
| B | "..." |
| C | "This is ..." |
| D | "weather information" |
| E | "service." |
| F | "For weather information," |
| G | "press 1#" |
| H | "press 2#" |

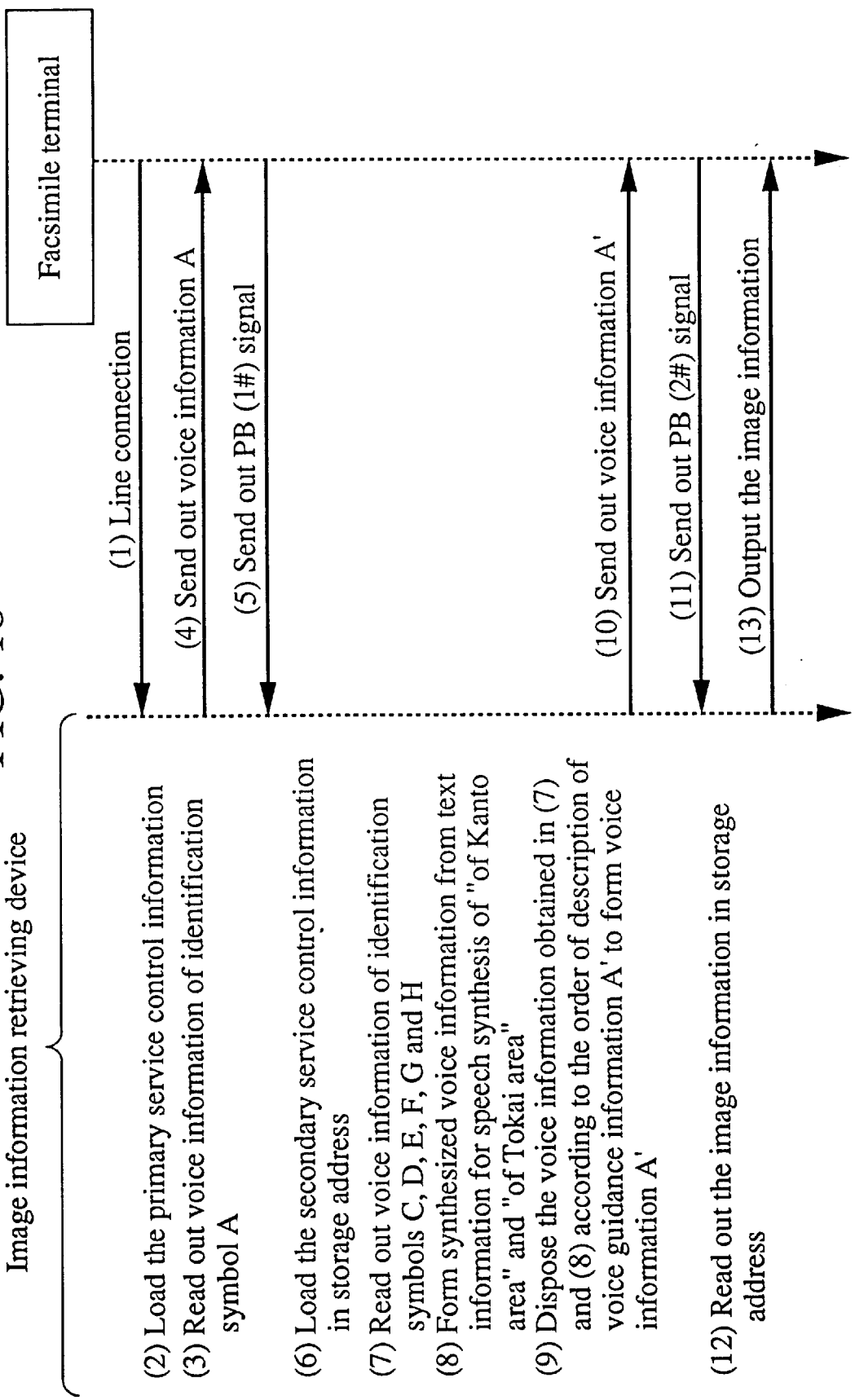

FIG. 19

```
[PAGE CODE = 2418]
<HTML>
<HEAD><TITLE> Kajii's Home Page </TITLE>
<1-Changed by : Ken KAJII, 10-Dec-1996 ->
</HEAD>
<Body bgcolor = "#IIIIII><BODY>
<center><Img src="/knage/ntt_logo.gil></center>
<hr noshade>
<center>
<h2><B><I>Welcom to Ken KAJII's Home Page</I></B></h2></p>
</center>
<h3><IMG SRC="Image/star.gil><information of pubs</h3>
<UL>
<L1> <A HREF= >telephone numbers of restaurants in the neighborhood of Yokosuka </a>
<L1> < A HREF="nomiya.html> information sent to Yokosuka Tuken 06 </a>
</ut>
<hr noshade>
<SCRIPT LANGUAGE = "I'm Script">
<!
[1]"Welcome to Kajii's Home Page. For facsimile reception of this page, press 1#, for voice information, press 2#, for buying ticket, press 3 #, and for ticket page, press 4#."
  [1-1] (SEND) (ADD= )
  [1-2] "For voice information, press 1#, for return to top page, press 2#."
  [1-2-1] (RADIO) (ADD= )
  [1-2-2] (PAGE=1)
  [1-3] (SEARCH) (ADD= )
  [1-4] (SEND) (ADD= )
>
</SCRIPT>
</BODY>
<ADDRESS>
kajii@aether.hil.ntt.jp
</ADDRESS>
</HTML>
```

FIG. 21

```
<HTML>
<HEAD><TITLE> TICKET GUIDE FIND TEST</TITLE></HEAD>
 <center>page for retrieval</center>
<FORM ACTION=    METHOD="GET:>
<L1>daytype : <br>
   <input type="radio" name="daytype" value="a">retrieval of performance date
   <input type="radio" name="daytype" value="b'>retrieval of sale date<br>
<L1>input of date : <INPUT TYPE = "text" NAME = "day" size = "10"
maxlength = "6"><br>
<L1>genre : <br>
<SELECT NAME="genre" SIZE="5">
<OPTION VALUE="11">soccer
<OPTION VALUE="12">softball
<OPTION VALUE="13">basketball
<OPTION VALUE="14">music (pops)
<OPTION VALUE="15">music (classic)
<OPTION VALUE="16">movies
<OPTION VALUE="17">drama
<OPTION VALUE="18">exhibition of paintings
<OPTION VALUE="19">ski
</SELECT><P>
<INPUT TYPE="submit" VALUE="retrieval">
</FORM>

<SCRIPT LANGUAGE = "ServiceScript">
<1
 [1] "Welcome to a page for selling tickets. For the people for the
first time, press 1#, for retrieval of ticket, press 2#."
  [1-1](SEND)(ADD=)
  [1-2] "To retrieve ticket, input daytype."
  (CGIINPUT, 1: daytype=a, 2: daytype=b)
   "Input date."
   (CGINUM, NAME=day, DIGIT=6)
   "Input genre."
    (CGIINPUT, 1: genre=11, 2: genre=12, 3: genre=13, 4: genre=14, 5
: genre=15, 6: genre=16, 7: genre=17, 8: genre=18, 9: genre=19)
  >
  </SCRIPT>
  </BODY>
  </HTML)
```

FIG. 22

Key code table for retrieval

Daytype :

| retrieval of performance date | 1# |
| retrieval of sale date | 2# |

Input date :   date of retrieval, 970202#
(in the case of February 2, 1997)

Genre :

| Soccer | 1# |
| Baseball | 2# |
| Basketball | 3# |
| Music (pops) | 4# |
| Music (classic) | 5# |
| Movies | 6# |
| Drama | 7# |
| Exhibition of paintings | 8# |
| Ski | 9# |

IMAGE INFORMATION RETRIEVING DEVICE, IMAGE DATABASE DEVICE, IMAGE INFORMATION STORING DEVICE AND RECORDING MEDIUM ON WHICH A PROGRAM PERFORMED BY THE IMAGE INFORMATION RETRIEVING DEVICE IS RECORDED

BACKGROUND OF THE INVENTION

1. Field of the Invention

The present invention relates to an image information retrieving device suitable for being used to retrieve an image database from a facsimile terminal and the like via a network composed of telecommunication equipment, an image database device, an image information storing device and a recording medium on which a program performed by the image information retrieving device is recorded. This specification is based on patent applications in Japan (Japanese Patent Application Nos. Hei 8-277732(1996), Hei 8-289676 (1996), Hei 8-330961(1996), Hei 8-330962(1996), Hei 8-330963(1996) and Hei 9-46173(1997), whose descriptions are incorporated herein as a part of this specification.

2. Description of the Related Art

Image information retrieving devices such as a facsimile BOX and the like have been heretofore proposed and put to practical use in order to realize a facsimile information service which carries out retrieval of image information from an image database by a facsimile terminal, via a network composed of telecommunication equipment. In general, as input/output device for facsimile terminals, there is the input/output of image information and voice information, and the input of numbers of from 0 to 9 and symbols * and # using a push button (hereinafter referred to as "PB"). However, only the PB has high reliability as an input device for input to an image information retrieving device from a facsimile terminal.

With the conventional image information retrieving device, retrieval (identification) of desired image information has been carried out by sending voice guidance to a facsimile terminal and transmitting PB signals from the facsimile terminal. For example, when a facsimile terminal is connected by phone to an image information retrieving device, the image information retrieving device will send the selection item corresponding to the PB to the facsimile terminal as voice guidance. When the PB corresponding to the selection item is pressed on the facsimile terminal, the corresponding PB signal is transmitted, and the image information retrieving device will recognize which PB is pressed by analyzing the received PB signal. Then, image information representative of the selection item corresponding to the PB is read out from the image information storing device connected to the image information retrieving device, and sent to the facsimile terminal.

With conventional image information retrieving devices, the processing procedure by means of the voice guidance and the PB to retrieve such desired image information is referred to as "voice response control procedure" or "service control procedure". Conventionally, the service control information which describes this service control procedure has been stored in the image information retrieving device. Namely, conventional facsimile image information retrieving device are operated according to one static service control procedure. Therefore, when changes such as addition or deletion are made in the image information stored in the image information storing device, the administrator of this image information retrieving device has had to change the service control information stored in the image information retrieving device. That is to say, with the conventional art, since the service control information has been stored in the block in the image information retrieving device, the control of the service control information has had to been performed in the block in the image information retrieving device.

Accordingly, when a system is constituted by arranging a plurality of image information storing devices separately from each other and connecting the image information retrieving device thereto via a network, and a number of people want to add or delete the image information separately at an optional time, the administrator has to rewrite the service control procedure of the image information retrieving device. Not only does this make the operation complicated, but also there may be a case where a desired image information cannot be correctly sent out to the facsimile terminal, if changes of the service control information, such as addition and deletion of the image information are not performed properly.

On the other hand, as a system for taking out information by accessing the WWW server on the Internet from a facsimile terminal there is for example WebFax and the like (see Literature: "Monthly Internet, February issue, 1997", SOFTBANK, P. 180–181). With these systems, an HTML file on the Internet is converted to image data for output to a facsimile and is output in response to input of a PB signal from a facsimile terminal. On the image data output to the facsimile, a number for taking out the data is assigned to a link point on a home page. Therefore, users can obtain the image data of the HTML file on the Internet by pressing a PB of a phone and a start button of a facsimile according to the voice guidance for the operation.

By using this system, users who have controlled the facsimile BOX and homepage of the Internet separately can update the information at the same time and provide the same information to a computer and a facsimile terminal. In addition, since this system can take in users of facsimile terminals, an increase in the number of users accessing a home page can be anticipated.

The conventional art described above, however, has the following problems:

(1) Since the voice guidance is stored in the image information retrieving device connected to facsimile terminals and fixed in the image information retrieving device, the administrator of home pages cannot change the voice guidance for each home page.

(2) With the image information retrieving device, since the HTML files per se which are the image data, are disposed separately by using the WWW server, it has been possible for a number of people to add or delete information individually on the HTML files at an optional time. However, service control information in which the service control procedure for facsimile terminals is described, has been stored in the image information retrieving device. Therefore, a number of home page producers cannot add or delete the guidance information or the service control information (the procedure for performing PB input for each home page), and service control information has had to be changed by the administrator of the image information retrieving device. Thus, since the service control information cannot be controlled separately, the administrator, who gives a description of service control procedures, has to grasp the whole and update the service control procedures in the image information retrieving device. As a result, as the scale of the whole service increases, it becomes difficult to grasp the whole service, resulting in the necessity to perform more complicated programming, so that the control thereof becomes more and more difficult.

(3) Furthermore, programming language such as individual type script language, C language, VisualBasic, MediaLogue (Matsushita Denki Sangyo Co., Ltd.) and the like have been conventionally used to describe the service control procedures. In these programming languages and script language, conditional branch is realized by means of "If conditional expression Then sentence 1 Else sentence 2", or "if (expression) sentence 1 else sentence 2", to describe the control structure, and declaration of a variable to be used has been required in advance. Since these programming languages do not premise retrieval of the image database by using a facsimile terminal, they have a freedom to realize a wide program. On the other hand, they have a problem in that it is difficult for users such as administrators having no programming experience, to perform programming.

(4) When the information to be retrieved is in a deep portion of a link structure of an HTML file, in the conventional device, it has been necessary to output first (i)_HTML file, then call again to output (ii)_HTML file, and call again to output (iii)_HTML file. Therefore, it has been necessary to make a call many times to retrieve information in a deep portion of the link structure, thus taking time.

(5) When a home page having a button, text field, select box and the like written by FORM (see literature: "The HTML SOURCE BOOK", Ian S. Graham, ISBNO-471-11849-4) which is a tag for executing CGI (Common Gateway Interface) is output, the output is carried out by ignoring the portion of the FORM tag, or otherwise the button, text field, select box, execution button or the like is output in a state of default on a sheet of paper. When retrieval is performed by using a computer, the retrieval condition is specified by clicking a button or selection item displayed on a screen, and inputting a character string in a text field, and retrieval is performed by clicking an execution button so that the retrieval results can be displayed on the screen. When retrieval is performed by using a facsimile terminal, however, buttons, text field, select box, execution button and the like are displayed, but since they are displayed on a sheet of paper and the telephone line is already disconnected by phone, pressing respective buttons or input thereto cannot be performed. Therefore, there has been such a problem that retrieval by specifying the retrieval condition cannot be performed by utilizing a CGI program on the WWW server.

In view of the above situation, it is an object of the present invention to realize an image information retrieving device and an image database device using the same, wherein, in an image database which can be searched from an image communication terminal such as a facsimile terminal, even if a number of people add or delete image information separately at an optional time, it is not necessary to rewrite the service control procedure in the image information retrieving device every time.

Furthermore, it is an object of the present invention to provide; an image information retrieving device utilizing the WWW on the Internet from a facsimile terminal which can solve the problems indicated above from (1) to (5), an image database device, an image information storing device, and a recording medium on which a program performed by the image information retrieving device is stored.

SUMMARY OF THE INVENTION

In order to solve the above problems, the first embodiment of the present invention is n image information retrieving device comprising: a primary service control information storing section in which primary service control information is stored in advance; a response section which performs between an image communication terminal which is connected to a line, output of guidance information in accordance with a service control procedure indicated by primary service control information stored in the primary service control information storing section, input of an assignment signal from a user based on the guidance information, and output of image information as a retrieval result based on the assignment signal; a retrieval processing section which retrieves image information from an image information storing device in response to the operation of the response section, reads the image information as the retrieval result, and outputs the image information to the response section; a secondary service control information storing section for storing temporarily secondary service control information showing a service control procedure which is stored together with the image information in the image information storing device and following on from the service control procedure shown by the primary service control information stored in the primary service control information storing section; and a control section in the response section, which directs the retrieval processing section to read the secondary service control information from the image information storing device and store this in the secondary service control information storing section at the time of input of the assignment signal, and performs control for outputting the guidance information to the image communication terminal in accordance with the service control procedure indicated by the stored secondary service control information.

Furthermore, another embodiment of the present invention is a recording medium on which is recorded a program for executing: a process for outputting first guidance information to an image communication terminal connected to a line, according to a service procedure indicated by primary service control information stored in advance; a process for reading in and storing temporarily secondary service control information which is stored together with the image information from the image information storing device which stores the image information corresponding to the assignment signal input from a user based on the first guidance information, and which shows a service control procedure following on from the service control procedure shown by the primary service control information; a process for outputting the second guidance information to the image communication terminal according to the service control procedure shown by the stored secondary service control information; and a process for retrieving the image information corresponding to the assignment signal input from the user based on the second guidance information, reading in the image information as a retrieval result, and outputting the read-in image information to the image communication terminal.

Moreover, another embodiment of the present invention is an image information storing device comprising a connecting section for connecting to a communication network, and a storage section for storing image information and a secondary service control information showing service control procedures for facsimile terminals as data formed by using an HTML file written by HTML, wherein the secondary service control information stored in the storage section is written as a script in a specific style in a portion of the HTML file, and contains voice guidance information for output to facsimile terminals.

According to the present invention, when image information stored in an image information storing device is added or deleted, and the service control information has to be changed, the secondary service control information stored in the image information storing device relevant to the image information has only to be changed. That is to say, with an image database, it is possible to realize an image information retrieving device and an image database device, in which even if a number of people add or delete image information separately at an optional time, it is not necessary to rewrite the service control procedure in the image information retrieving device every time. The present invention has a noticeable effect, especially in a distributed image database, in which changes to the service control information can become complex.

BRIEF DESCRIPTION OF THE DRAWINGS

FIG. 2A is a diagram showing an example of a structure of primary service control information, and FIG. 2B is a diagram showing an example of a structure of secondary service control information, in the embodiment;

FIG. 6 is a service processing flow chart showing one example of processing by means of the primary service control information shown in FIG. 5;

FIG. 7 is a diagram showing an example of a structure of secondary service control information in the embodiment shown in FIG. 5;

FIG. 8 is a service processing flow chart showing one example of processing by means of the secondary service control information shown in FIG. 7;

FIG. 9 is a block diagram showing an actual example of a structure of a second embodiment according to the present invention;

FIG. 12 is a diagram showing one example of description of image label information in the fourth embodiment;

FIG. 13A is a diagram showing an example of primary service control information, and FIG. 13B is a diagram showing an example of secondary service control information in the fourth embodiment;

FIGS. 17A–C are diagrams for explaining examples of a structure of service control information in the embodiment shown in FIG. 16;

FIG. 18 is a diagram showing an example of service processing flow in the embodiment shown in FIG. 16;

FIG. 19 is a diagram showing an example of description of the service control script in a sixth embodiment of the present invention;

FIG. 21 is a diagram showing an example of description of the service control script in the sixth embodiment;

FIG. 22 is a diagram showing a correspondence table of parameters and numeral codes which are output from a facsimile and are held by a user in advance in the sixth embodiment;

DESCRIPTION OF PREFERRED EMBODIMENTS

Embodiments of the present invention will now be described in detail with reference to the accompanying drawings.

[First Embodiment]

Figure 1:
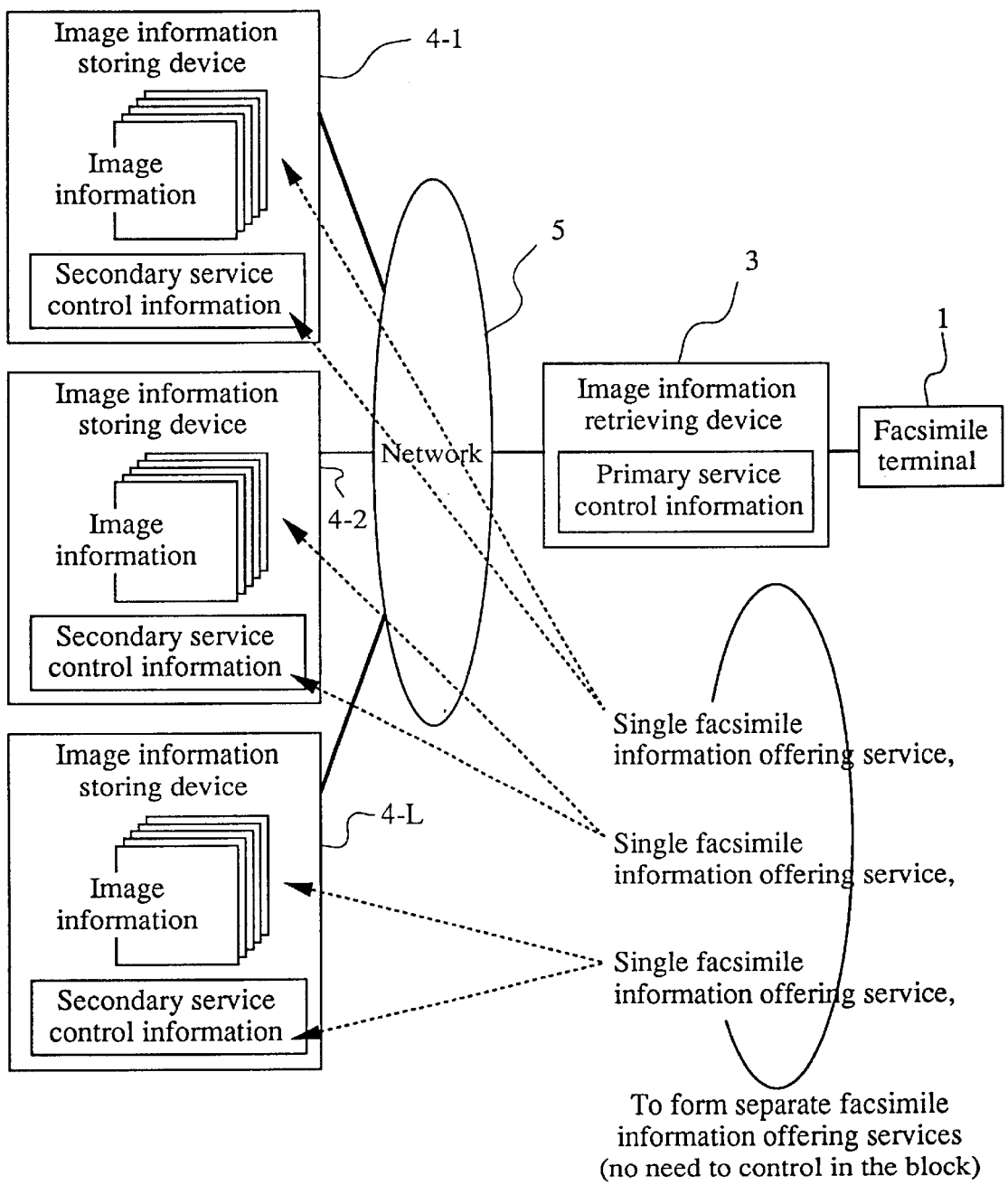
FIG. 1 is a schematic diagram showing one embodiment of an image database retrieving system using respective devices, according to the present invention.

FIG. 1 is a structural diagram showing one embodiment of an image database retrieving system using respective devices, according to the present invention. With the image database retrieving system of this embodiment, a plurality of image information storing devices 4-1, 4-2, 4-L are connected to an image information retrieving device 3 via a network 5 (in this example shown in FIG. 1, L represents an integer of 3 or more). In the image information retrieving device 3 in this embodiment, primary service control information is stored, and in the individual image information storing device 4, a plurality of secondary service control information and image information are stored. Here, the secondary service control information is a structural element adopted by the present invention, and comprises text data and the like which describes service control information for facsimile terminals in conformity with the content of the image information. Since each secondary service control information corresponds to each facsimile information service, respectively, a facsimile terminal 1 connected by phone to the image information retrieving device 3 can get various facsimile information services corresponding to each image information storing device 4-1, . . . , 4-L by means of the same image information retrieving device 3.

FIG. 2A is a diagram showing an example of a structure of primary service control information, and FIG. 2B is a diagram showing an example of a structure of secondary service control information in this embodiment. In the primary service control information and the secondary service control information, service control procedure is written by mixing voice information A, B, A' and the like representing voice guidance to be sent out to the facsimile terminal 1, and execution information A, B, A' and the like representing which operation should be taken when a user specifies a number showing a response to the voice guidance using a PB.

Now, the operation of this embodiment will be described. When the facsimile terminal 1 is connected by phone to the image information retrieving device 3, the image information retrieving device 3 first reads in the primary service control information, and performs service control according to the primary service control information. In the primary service control information, there is described service control procedures for retrieving the secondary service control information corresponding to the desired facsimile information service. The image information retrieving device 3 performs voice guidance according to the service control procedure indicated by the primary service control information. The user is guided by this voice guidance to specify the secondary service control information corresponding to the desired facsimile information service from the facsimile terminal 1. When the secondary service control information which the user desires is specified, the image information retrieving device 3 reads in the corresponding secondary service control information from one of the corresponding image information storing devices 4-1, . . . , 4-L. In the secondary service control information, there is described a service control procedure for retrieving image information, or other secondary service control information. The image information retrieving device 3 performs voice guidance according to the service control procedure indicated by the secondary service control information. The user is guided by this voice guidance to specify the desired image information or desired (another) secondary service control information. The image information retrieving device 3 retrieves and reads in the specified image information from the image information storing devices 4-1, . . . , 4-L to send this out to the facsimile terminal 1, or to read in the specified secondary service control information and continue to perform the operation according to the service control procedure indicated by the secondary service control information.

Figure 3:
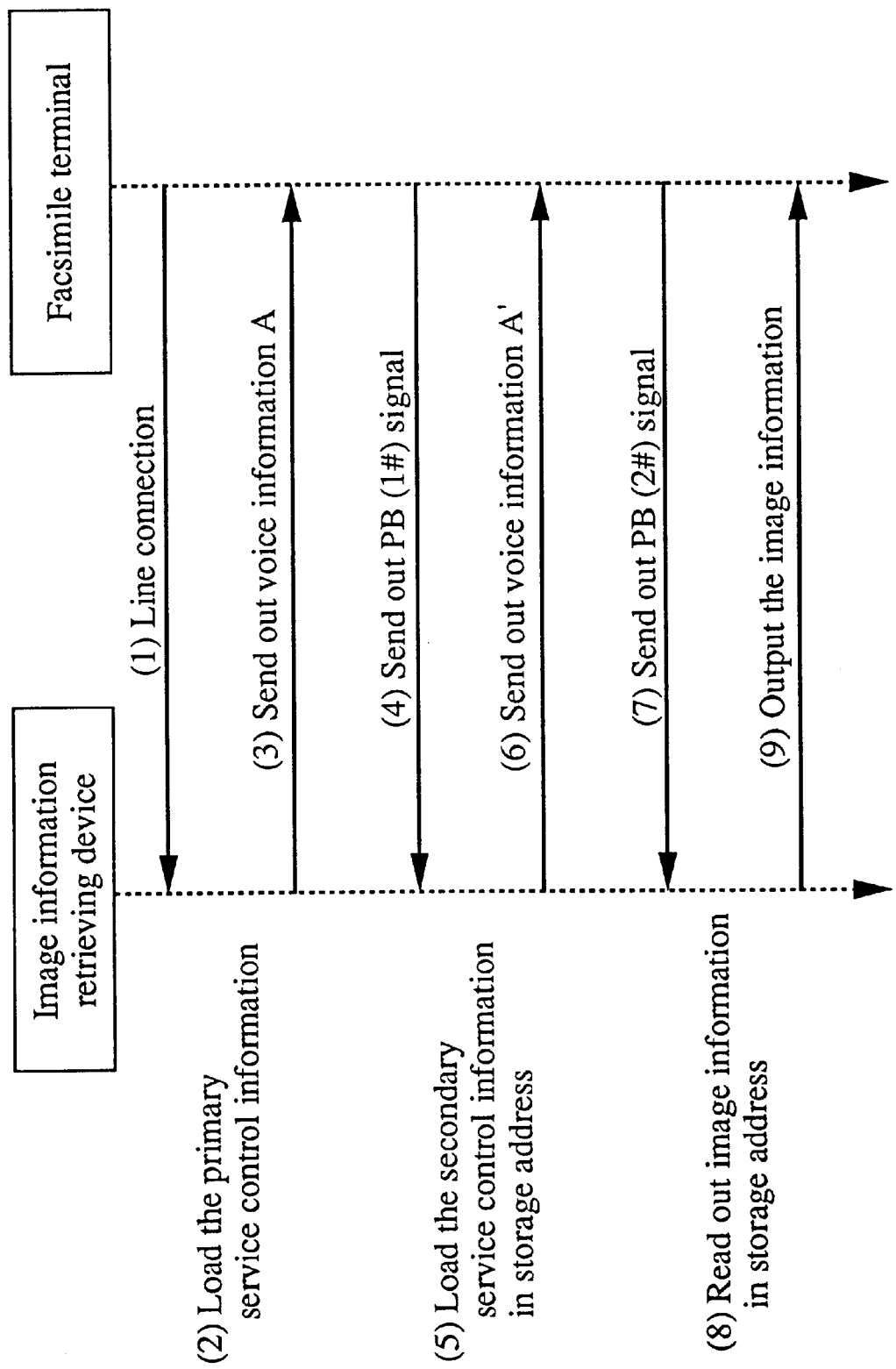
FIG. 3 is a service processing flow chart showing examples of operation in the embodiment.

An example of the operation described above is shown in FIG. 3. Numerals (1)~(9) are numbers showing the procedure in FIG. 3. First, when the facsimile terminal 1 is connected by phone to the image information retrieving device 3 (1), primary service control information is first read in (2). The voice guidance says, "This is XXX facsimile information service. For weather information, press 1#, for traffic information, press 2#", represented by voice information A is sent out to the facsimile terminal 1 (3). The user then inputs a number corresponding to the selection item shown by the voice guidance (in this case, "1#") using the PB. The facsimile terminal 1 then transmits the PB signal to the image information retrieving device 3 (4), and the image information retrieving device 3 converts the inputted PB signal to a number, and determines the operation to be performed next, referring to the execution information A by using this number. In this case, "1#" is input, therefore, the image information retrieving device 3 reads in the secondary service control information stored in a storage address α (5), and performs service control according thereto. Namely, voice guidance saying, "This is weather information service. For weather information in Kanto area, press 1#, for weather information in Tokai area, press 2#", represented by voice information A' is sent out (6). When the user presses "2#" using the PB, the PB signal is sent out from the facsimile terminal 1 (7). The image information retrieving device 3 then converts the PB signal to a number, and determines the operation to be performed next, referring to the execution information A'. Namely, in this case, the image information retrieving device 3 reads out image information stored in a storage address ω (8) and sends this out to the facsimile terminal 1 (9).

As described above, the present embodiment is characterized in that secondary service control information corresponding to a plurality of facsimile information services is dynamically read into the image information retrieving device 3, and the image information retrieving device 3 executes the facsimile information service according to the secondary service control information. Therefore, when image information stored in the image database is added or deleted, and the service control information has to be changed, the secondary service control information relevant to the image information has only to be changed. Namely, in a distributed image database, it is possible to realize an image information retrieving device in which even if a number of people add or delete image information separately at an optional time, it is not necessary to rewrite the service control procedure in the image information retrieving device every time.

Detailed examples of the structure and operation of each device in the above embodiment will now be described.

Figure 4:
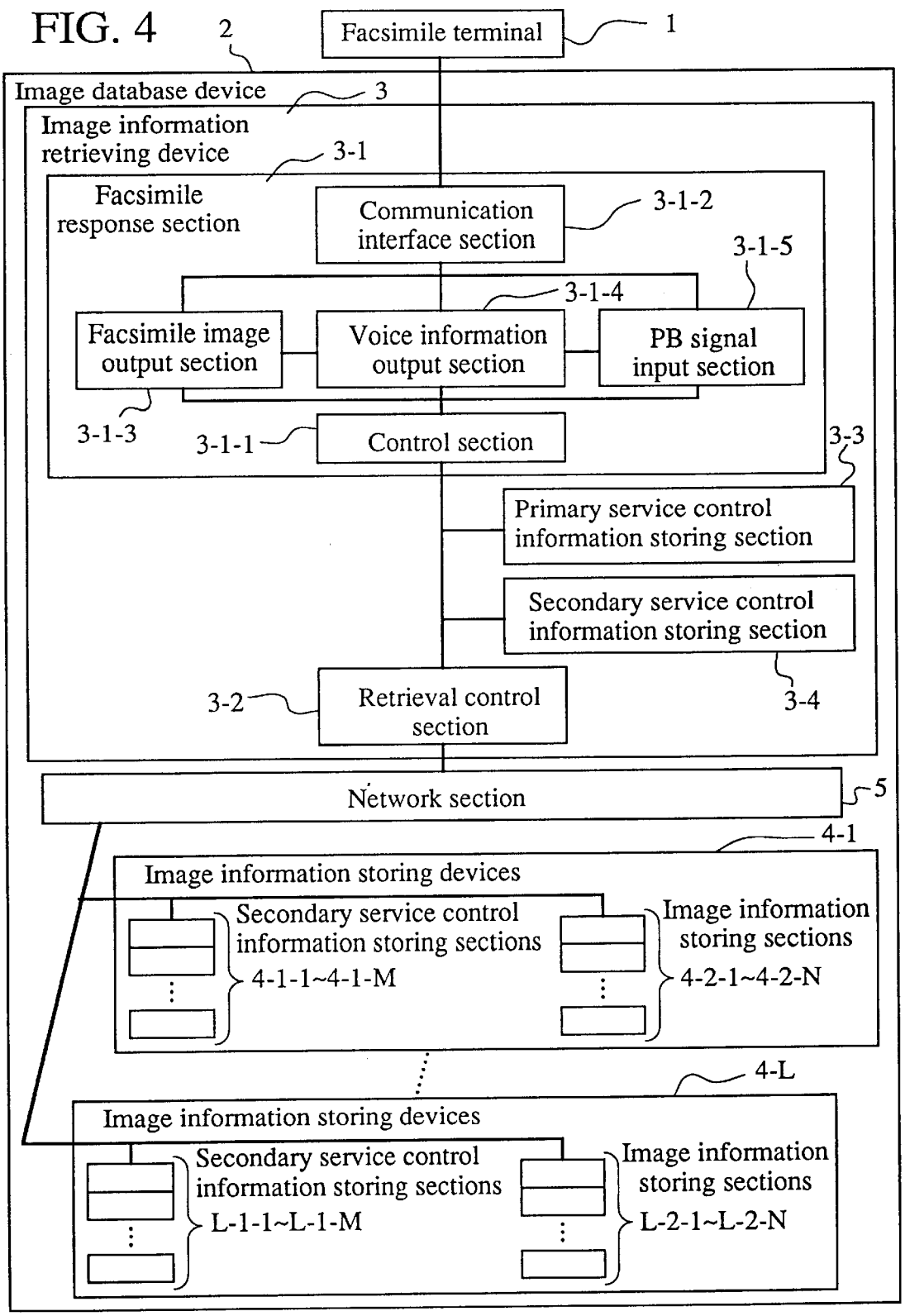
FIG. 4 is a diagram showing an example of detailed structure of each device in the embodiment.

FIG. 4 is a diagram showing a structural example thereof. The image database retrieving system according to the present invention shown in FIG. 4 comprises a facsimile terminal 1 and an image database device 2. The image database device 2 comprises; an image information retrieving device 3, image information storing devices 4-1~4-L, and a network section 5. The image information retrieving device 3 comprises; a facsimile response section 3-1, a retrieval processing section 3-2, a primary service control information storing section 3-3, and a secondary service control information storing section 3-4. The facsimile response section 3-1 comprises a control section 3-1-1, a communication interface section 3-1-2, a facsimile image output section 3-1-3, a voice information output section 3-1-4, and a PB signal input section 3-1-5. Furthermore, the image information storing sections 4-1~4-L comprise secondary service control information storing sections 4-1-1~4-1-M, . . . , L-1-1~L-1-M, and image information storing sections 4-2-1~4-2-N, . . . , L-2-1~L-2-N. Primary service control information, secondary service control information and image information are stored in advance in the primary service control information storing section 3-3, in the secondary service control information storing sections 4-1-1~4-1-M, . . . , L-1-1~L-1-M and in the image information storing sections 4-2-1~4-2-N, . . . , L-2-1~L-2-N, respectively.

In order to operate the database device 2 in the present embodiment, the facsimile terminal 1 is first connected by phone to the communication interface section 3-1-2. Upon connection, the communication interface section 3-1-2 outputs a service start request signal to the control section 3-1-1. When the service start request signal is input to the control section 3-1-1, the control section 3-1-1 reads the primary service control information from the primary service control information storing section 3-3, and outputs voice information to the voice information output section 3-1-4 according to the service control procedure described in the primary service control information. The voice information output section 3-1-4 converts the voice information to an aural signal which can be heard by phone, and outputs the aural signal to the facsimile terminal 1 via the communication interface section 3-1-2.

On the facsimile terminal 1 side, the user receives the aural signal, and inputs a number corresponding to the response using the PB of the facsimile terminal 1. The facsimile terminal 1 outputs the PB signal corresponding to the PB to the communication interface section 3-1-2. Upon input of the PB signal, the communication interface section 3-1-2 outputs the PB signal to PB signal input section 3-1-5. The PB signal input section 3-1-5 then converts the PB signal to number information corresponding thereto, and outputs the number information to the control section 3-1-1.

The control section 3-1-1 receives the number information and outputs storage address information of the corresponding secondary service control information to the retrieval processing section 3-2, according to corresponding execution information of the primary service control information. The retrieval processing section 3-2 reads out secondary service control information from the secondary service control information storing sections 4-1-1~4-1-M, ..., 4-L-1~4-L-M on the image information storing devices 4-1~4-L shown by the storage address information via the network section 5, and temporarily stores the secondary service control information in the secondary service control information storing section 3-4 of the image information retrieving device 3.

The control section 3-1-1 reads out secondary service control information stored in the secondary service control information storing section 3-4, and outputs voice information to the voice information output section 3-1-4 according to the service control procedure written in the secondary service control information. The voice information output section 3-1-4 converts the voice information to an aural signal which can be heard by phone, and outputs the aural signal to the facsimile terminal 1 via the communication interface section 3-1-2.

On the facsimile terminal 1 side, the user receives the aural signal, and inputs a number corresponding to the desired response using the PB of the facsimile terminal 1. The facsimile terminal 1 outputs the PB signal corresponding to the PB, to the communication interface section 3-1-2. Upon input of the PB signal, the communication interface section 3-1-2 outputs the PB signal to PB signal input section 3-1-5. The PB signal input section 3-1-5 then converts the PB signal to number information corresponding thereto, and outputs the number information to the control section 3-1-1.

Upon input of the number information, the control section 3-1-1 outputs storage address information of corresponding image information to the retrieval processing section 3-2, according to corresponding execution information of the secondary service control information. The retrieval processing section 3-2 reads out image information stored in the image information storing sections 4-2-1~4-2-N, ..., L-2-1~L-2-N on the image information storing devices 4-1~4-L shown by the storage address information via the network section 5, and outputs the image information to the control section 3-2-1. Upon input of the image information, the control section 3-1-1 outputs the image information to a facsimile image information output section 3-1-3. The facsimile image information output section 3-1-3 encodes the image information for facsimile, and outputs the code to the facsimile terminal 1 via a communication interface 3-1-2.

With the present embodiment, secondary service control information corresponding to a plurality of facsimile information services is dynamically read into the image information retrieving device 3 by the structure and operation described above. It thereby becomes possible for the image information retrieving device 3 to execute the facsimile information service according to the secondary service control information.

Referring to FIG. 4, with the image information retrieving device, the primary service control information storing section and the secondary service control information storing section are described separately. Similarly, with the image information storing device, the secondary service control information storing section and the image information storing section are described separately. Needless to say, respective information may be stored by using the same storing section, respectively. Furthermore, with the above embodiment, the present invention is applied to the facsimile information service for facsimile terminals. The present invention however is also applicable to image information services to other image communication terminals. In addition, with the above embodiment, the present invention is applied to the distributed image database using a plurality of image information storing devices. However, the present invention is also applicable to an image database using a single image information storing device.

As described above, according to the present embodiment, when image information stored in the image information storing device is added or deleted, and the service control information has to be changed, the secondary service control information stored in the image information storing device relevant to the image information has only to be changed. That is to say, with an image database, it is possible to realize an image information retrieving device and an image database device, in which even if a number of people add or delete image information separately at an optional time, it is not necessary to rewrite the service control procedure in the image information retrieving device every time. The present invention has a noticeable effect, especially in a distributed image database, in which changes to the service control information can become complex.

[Second Embodiment]

With the image database retrieving system of the present embodiment, as shown in FIG. 8, an image information retrieving device 204 is connected to an image information storing device 206 via a network. To this image information retrieving device 204, as shown in FIG. 6 and FIG. 8, a facsimile terminal 1 is connected via a communication network such as telephone network or the like. In addition, computer terminals can be connected to the image information retrieving device 204 of the present embodiment.

Figure 5:
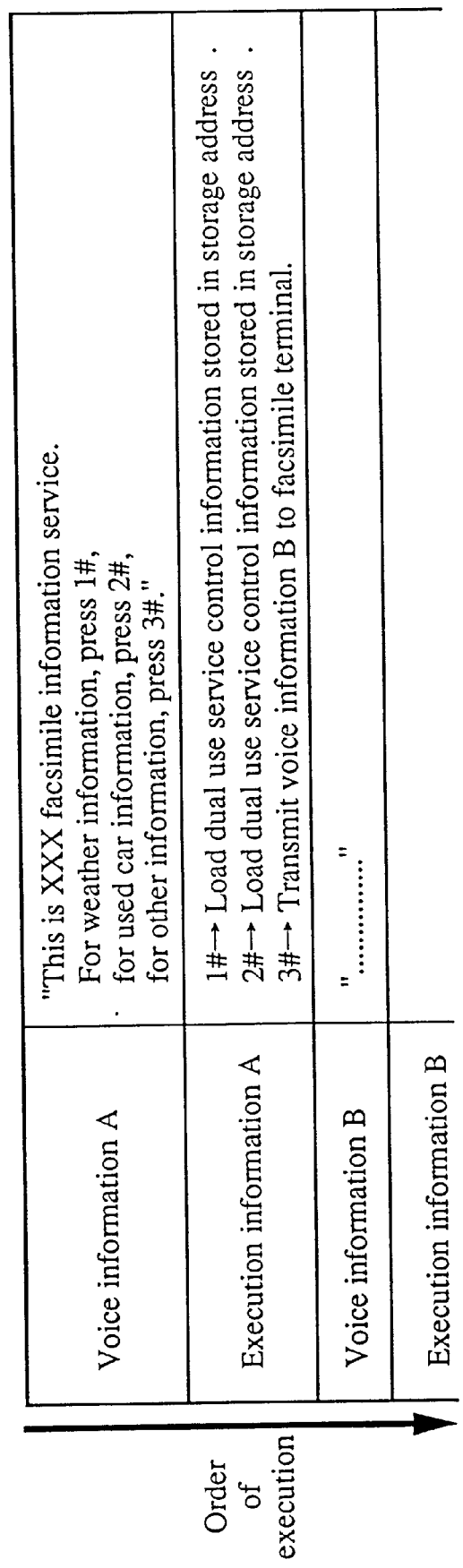
FIG. 5 is a diagram showing an example of a structure of primary service control information in a second embodiment of an image database device for facsimile terminals according to the present invention.

In the image information retrieving device 204, primary service control information is stored in advance. FIG. 5 shows one example of the primary service control information. The primary service control information shows the service procedure to be executed first to the facsimile terminal 1 connected by phone. The service control procedure is written in the primary service control information, by mixing voice information A, B . . . representing voice guidance to be sent out to the facsimile terminal 1, and execution information A, B . . . representing which operation should be taken when the user specifies a number indicating the response to the voice guidance using the PB.

Furthermore, with the present embodiment, in individual forms stored in the image information storing device 206, that is, in retrieval input form-describing information, there is also written secondary service control information which describes the service control procedure of the image information retrieving device 204 corresponding to the form. FIG. 7 shows one example of the secondary service control information. Hereinafter, information including a form for computer terminals and secondary service control information for facsimile terminals is referred to as "dual use service control information". When the dual use service control information is written, if secondary service control information is written in a comment column of the retrieval input form-describing information (computer terminals ignore the content written here), then computer terminals only see the retrieval input form-describing information in the dual use service control information, and cannot see the secondary service control information.

The operation of the image database retrieving system having the basic structure as described above will now be described.

FIG. 6 is a flow chart showing one example of processing of service control according to the primary service control information. The numbers in parentheses in the drawing show the order of processing. When a telephone line is connected between the facsimile terminal 1 and the image information retrieving device 204 (1), the image information retrieving device 204 first reads in the primary service control information (2), and performs service control according to the primary service control information. Namely, voice guidance according to the primary service control information is sent out (3), and the user responds thereto using the PB (4) to specify the desired dual use service control information. The image information retrieving device 204 reads in the specified dual use service control information (5) to perform the service control according to the secondary service control information therein.

FIG. 8 is a flow chart showing one example of processing of service control according to the secondary service control information in the dual use service control information. The numbers in parentheses in the drawing show the order of processing subsequent to FIG. 6. A case where service processing is performed based on the secondary service control information shown in FIG. 7, will be described as an example.

The image information retrieving device 204 sends out the selection item for specifying the retrieval condition according to the secondary service control information subsequent to the processing (5) described above, for example, voice information A, to the facsimile terminal 1 as voice guidance (6). On the facsimile terminal 1 side, the user selects the selection item by PB input. After this process is repeated many times, the image information retrieving device 204 specifies the retrieval condition necessary for database retrieval. For example, when the user responds using the PB, to the voice information A from the facsimile terminal 1 (7), the image information retrieving device 204 specifies the retrieval condition A according to the execution information A (8). Then, voice information B indicating the selection item for specifying another retrieving condition B is sent out to the facsimile terminal 1 as voice guidance (9), and when the user responds to the voice information B using the PB from the facsimile terminal 1 (10), the image information retrieving device 204 specifies the retrieving condition B according to the execution information B (11). As described above, when the retrieving condition is specified, the image information retrieving device 204 sends out the voice information C indicating a selection item for whether or not retrieval is to be executed, to the facsimile terminal 1 as voice guidance (12).

When PB input for retrieval execution is executed from the facsimile terminal 1 (13), the image information retrieving device 204 forms retrieval condition information from the specified retrieval conditions A and B, and sends out the information to the image information storing device 206 (14), as with the case where a computer terminal transmits to the image information storing device 206. The image information storing device 206 retrieves the data record corresponding to the retrieval condition information from the data storing section (15), forms image information described by an image information-describing language such as HTML (the same as sent to the computer terminal) (16), and sends out the image information to the image information retrieving device 204 (17). The image information retrieving device 204 converts the image information to facsimile image information (18) and sends out the facsimile image information to the facsimile terminal 1 (19).

As described above, both the retrieval condition input form-describing information for computer terminals and the secondary service control information of the image information retrieving device are stored in the image information storing device 206 in a form of dual use service control information. The image information retrieving device 204 has a service control function according to the secondary service control information, as well as a retrieval processing request function to the image information storing device 206. Therefore, input of the retrieval condition from the facsimile terminal 1 and dynamic service control become possible. Accordingly, it becomes possible to perform retrieval from the existing facsimile terminal 1 to the image information storing device 206 which is structured presupposing access from computer terminals.

An actual structure of the present embodiment will now be described. FIG. 9 is a block diagram showing a actual structure of the present embodiment. A system shown in FIG. 9 comprises; a facsimile terminal 1, a computer terminal 202 and a database device 203. The database device 203 comprises; an image information retrieving device 204, a network section 5, and image information storing devices 206-1~206-L. The image information retrieving device 204 comprises; a facsimile response section 204-1, an image information converting section 204-2, a service control section 204-3, a service control information storing section 204-4, a retrieval processing section 204-5, and a secondary service control information-extracting section 204-6. The service control information storing section 204-4 comprises; a primary service control information storing section 204-4-1 and a secondary service control information storing section 204-4-2. The image information storing devices 206-1~206-L comprise; image information creating sections 206-1-1~206-L-1, retrieval processing sections 206-1-2~206-L-2, dual use service control information storing sections 206-1-3~206-L-3, data storing sections 206-1-4~206-L-4, and image information storing sections 206-1-5~206-L-5.

In order to operate the image database device 203 of the present embodiment, the facsimile terminal 1 is first connected by phone to the facsimile response section 204-1. Upon connection, the facsimile response section 204-1 outputs a service start request signal to the service control section 204-3. When the service start request signal is input to the service control section 204-3, the service control section 204-3 reads primary service control information from the primary service control information storing section 204-4-1, and outputs voice information to the facsimile response section 204-1 according to the service control procedure written in the primary service control information. The facsimile response section 204-1 converts the voice information to an aural signal which can be heard by phone, and outputs the aural signal to the facsimile terminal 1.

On the facsimile terminal 1 side, the user receives the aural signal, and inputs a number corresponding to the response using the PB of the facsimile terminal. The facsimile terminal 1 outputs a PB signal corresponding to the PB, to the facsimile response section 204-1. Upon input of the PB signal, the facsimile response section 204-1 converts the PB signal to number information corresponding thereto, and outputs the number information to the service control section 204-3. The service control section 204-3 receives the number information, and outputs storage address information of the corresponding dual use service control information to the retrieval processing section 204-5 according to the corresponding execution information of the primary service control information.

The retrieval processing section 204-5 reads out the dual use service control information from the dual use service control information storing sections 206-1-3~206-L-3 on the image information storing devices 206-1~206-L indicated by the storage address information via the network section 5, and outputs the information to the secondary service control information-extracting section 204-6. The secondary service control information-extracting section 204-6 extracts the secondary service control information for the image information retrieving device written in comment columns or the like from the dual use service control information, and temporarily stores the information in the secondary service control information storing section 204-4-2.

The service control section 204-3 reads out the secondary service control information stored in the secondary service control information storing section 204-4-2, and outputs voice information to the facsimile response section 204-1 according to the service control procedure written in the secondary service control information, or outputs the storage address of image information to the retrieval processing section 204-5.

When the service control section 204-3 outputs the storage address of image information to the retrieval processing section 204-5, the retrieval processing section 204-5 reads out image information from the image information storing sections 206-1-5~206-L-5 of the corresponding image information storing devices 206-1~206-L, and outputs the image information to the image information converting section 204-2. The image information converting section 204-2 converts the image information to facsimile image information and outputs the converted facsimile image information to the facsimile response section 204-1. The facsimile response section 204-1 outputs the facsimile image information to the facsimile terminal 1.

On the other hand, when the service control section 204-3 outputs voice information to the facsimile response section 204-1, the facsimile response section 204-1 converts the voice information to an aural signal which can be heard by phone, and outputs the aural signal to the facsimile terminal 1. On the facsimile terminal side 1, the user hears the aural signal, and inputs a number corresponding to the desired response using the PB of the facsimile terminal 1. The facsimile terminal 1 outputs the PB signal corresponding to the PB to the facsimile response section 204-1. Upon input of the PB, the facsimile response section 204-1 converts the PB signal to number information corresponding thereto, and outputs the number information to the service control section 204-3.

The service control section 204-3 receives the number information, converts the number information to retrieval condition information according to the execution information of the secondary service control information, and outputs the retrieval condition information to the retrieval processing section 204-5. The retrieval processing section 204-5 outputs the retrieval condition information to the retrieval processing sections 206-1-2~206-L-2 of the image information storing devices 206-1~206-L. The retrieval processing sections 206-1-2 ~206-L-2 retrieve the data record corresponding to the retrieval condition information from the data storing sections 206-1-4~206-L-4, and output the data record to the image information creating sections 206-1-1~206-L-1. The image information creating sections 206-1-1~206-L-1 form image information from the data record, and output the image information to the retrieval processing section 204-5 of the image information retrieving device 204 via the network section 5. The retrieval processing section 204-5 outputs the image information to the image information converting section 204-2. The image information converting section 204-2 then converts the image information to facsimile image information and outputs the facsimile image information to the facsimile response section 204-1. The facsimile response section 204-1 then outputs the facsimile image information to the facsimile terminal 1.

The computer terminal 202 is connected as usual to the image information storing devices 206-1~206-L via the network section 5, and receives the dual use service control information written so as to ignore the secondary service control procedure for the image information retrieving device, from the image information storing devices 206-1~206-L, thus enabling data retrieval as usual.

As described above, the dual use service control information is written in the service control information of the image information storing devices 206-1~206-L, such that the image information retrieving device 204 extracts the secondary service control information, and the computer terminal 202 can see only the retrieval input form describing information. Hence data retrieval from the facsimile terminal 1 to the image information storing devices 206-1~206-L for existing computer terminals becomes possible.

As described above, according to the present embodiment, the dual use service control information is written in the service control information of the image information storing devices 206-1~206-L, such that the image information retrieving device 204 extracts the secondary service control information, and the computer terminal 202 can see only the retrieval input form-describing information, and the database retrieving device stores the primary service control information which is not concerned with the contents of the image information storing device as service control information to be first sent out to facsimile terminals, and the secondary service control information which is concerned with changes or the like of the contents of the image information storing device is extracted from the dual use service control information. Therefore, data retrieval from the facsimile terminals becomes possible to one or a plurality of image information storing devices for existing computer terminals using the WWW and the like.

[Third Embodiment]

With the embodiment described above, there is a problem in that since the service control information added to the image information in the facsimile information providing system includes voice information for voice guidance, data volume becomes large compared to the conventional system. Therefore, it takes a long time to read image information with appended service control information for the image information retrieving device from the image database device, and hence users of facsimile terminals have to wait for long time.

Therefore, with the present embodiment, with an image information retrieving device in which dynamic service control for retrieval from facsimile terminals, of distributed image databases combined with computer networks is possible, a structure is adopted such that the user's waiting time for reading image information appended with service control information is shortened.

Figure 10:
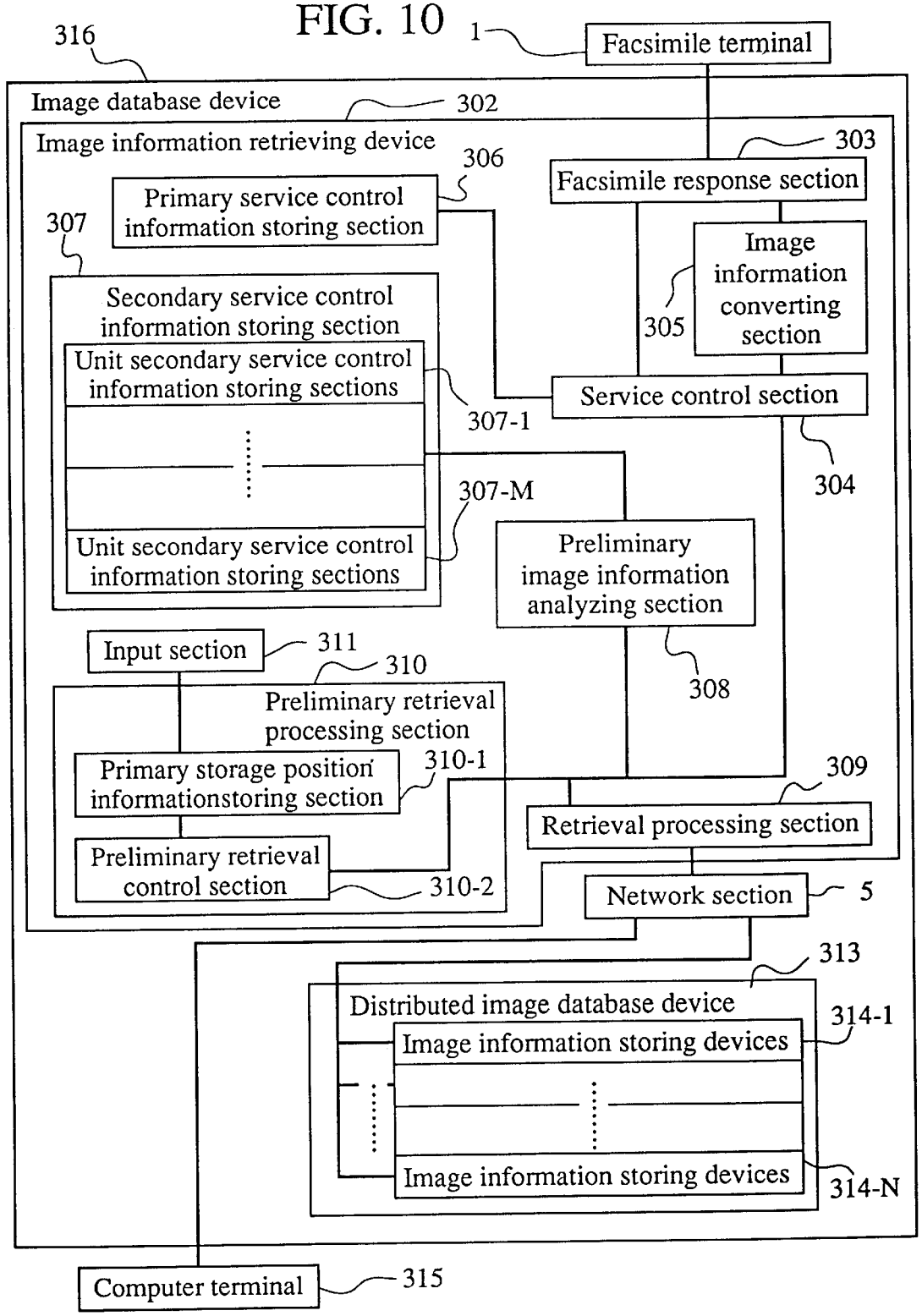
FIG. 10 is a structural diagram of a system showing a third embodiment of the present invention.

FIG. 10 shows a system structure which is one example of the present embodiment. In FIG. 10, a facsimile terminal 1 and computer terminal 315 are connected to an image database device 316. The image database device 316 is so constituted that an image information retrieving device 302 and a distributed image database device 313 are coupled to a network section 5. An image information retrieving device 302 comprises; a facsimile response section 303, a service control section 304, an image information converting section 305, a primary service control information storing section 306, a secondary service control information storing section 307, a preliminary image information analyzing section 308, a retrieval processing section 309, a preliminary retrieval processing section 310, and an input section 311. In this case, the secondary service control information storing section 307 comprises a plurality of unit secondary service control information storing sections 307-1~307-M. A preliminary retrieval processing section 310 comprises a primary storage position information storing section 310-1 and a preliminary retrieval control section 310-2. In addition, the distributed image database device 313 comprises a plurality of the image information storing devices 314-1~314-N which are coupled to the network section 5, respectively.

The computer terminal 315 is coupled to the network section 5. The facsimile terminal 1 is coupled to the facsimile response section 303 via a telephone network (not shown). The image information retrieving device 302 is coupled to the network 5 via the retrieval processing section 309. It is assumed that primary service control information is stored in advance in the primary service control information storing section 306, and image information and image information affixed with service control information are stored in advance in the image information storing devices 314-1~314-N of the distributed image database device 313.

The operation of the image database device 316 can be divided into two modes. The first mode is where there is no access from the facsimile terminal 1, and the second mode is where there is access from the facsimile terminal 1.

In the first mode where there is no access from the facsimile terminal 1, storage position information of primary image information for preliminary retrieval is first input from the input section 311 and stored in the primary storage position information storing section 310-1. The preliminary retrieval control section 310-2 reads out the storage position information stored in the primary storage position information storing section 310-1, and outputs the storage position information to the retrieval processing section 309 (3A). The retrieval processing section 309 reads out image information from the storage position of the image information storing devices 314-1~314-N in the distributed image database device 313 corresponding to the storage position information, and outputs the storage position information and the image information to the preliminary image information analyzing section 308. The preliminary image information analyzing section 308 then analyzes the image information, and separates service control information if the image information is image information with appended service control information, and stores the service control information in the unit secondary service image information storing sections 307-1~307-M of the secondary service control information storing section 307, together with the storage position information. If encoded voice information (containing text information for speech synthesis) is contained in the service control information, the preliminary image information analyzing section 308 decodes the encoded voice information, and stores the information in the unit secondary service control information storing sections 307-1~307-M. Then, the preliminary image information analyzing section 308 extracts storage position information of other image information written in the image information, and outputs the storage position information to the preliminary retrieval control section 310-2 (3A').

The preliminary retrieval control section 310-2 outputs the storage position information again to the retrieval processing section 309, and continues to repeat the processing of from (3A) to (3A') at regular intervals. By virtue of such a structure, it is possible in the first mode to store the service control information of the image information with appended service control information and the storage position information thereof, among the image information stored in the distributed image database device 313, together with the voice information of the voice guidance contained in the service control information, in advance in the image information retrieving device 302.

With the second mode where there is access from the facsimile terminal 1, the operation is as described below. First, the telephone line is connected from the facsimile terminal 1 to the facsimile response section 303. Upon connection, the facsimile response section 303 outputs a service start request signal to the service control section 304. Upon receipt of the service start request signal, the service control section 304 reads out primary service control information, and outputs voice information to the facsimile response section 303 according to a service control procedure written in the primary service control information. The facsimile response section 303 converts the voice information to an aural signal which can be heard by phone, and outputs the aural signal to the facsimile terminal 1.

On the facsimile terminal 1 side, the user receives the aural signal, and inputs a number corresponding to the response using the PB of the facsimile terminal 1. The facsimile terminal 1 outputs PB signal corresponding to the PB to the facsimile response section 303. Upon input of the PB signal, the facsimile response section 303 converts the PB signal to number information corresponding thereto, and outputs the number information to the service control section 304.

Upon input of the number information, the service control section 304 retrieves service control information corresponding to storage position information of corresponding image information from the unit secondary service control information storing sections 307-1~307-M of the secondary service control information storing section 307, and reads it out. The service control section 304 operates relative to the facsimile response section 303 and the secondary service control information storing section 307, as with the case of the primary service control information, according to the service control information.

If there is no corresponding service control information, the storage position information is output to the retrieval processing section 309. The retrieval processing section 309 reads out image information from storage positions of the image information storing devices 314-1~314-N in the distributed image database device 313 shown by the storage position information via the network section 5, and outputs the image information to the service control section 304. If the image information is image information with appended service control information, the service control section 304 operates relative to the facsimile response section 303, the secondary service control information storing section 307 and the retrieval processing section 309, as with the case of the primary service control information, according to the service control information. If the image information is not image information with appended service control information, the image information is output to the image information converting section 305. The image information converting section 305 converts the image information to facsimile image information, and outputs the facsimile image information to the facsimile response section 303.

The facsimile response section 303 outputs the image information to the facsimile terminal 1.

Needless to say, image information stored in the distributed image database device 313 can be retrieved via the network 5 from the computer terminal 315.

With such a structure, if the image information specified by the user using the PB of the facsimile terminal 1 is image information with appended service control information, and the service control information is stored in the primary service control information storing section 307 in the first mode, it is possible to perform such operations as to send out voice information to the facsimile terminal 1 immediately, and to receive a PB signal. Therefore, it is possible to shorten the waiting time of users on the facsimile terminal 1 side.

As described above, according to the present embodiment, with an image information storing device capable of performing dynamic service control for retrieval of a distributed image database coupled to a computer network from the facsimile terminals, it is possible to shorten the waiting time of users for the reading in of image information with appended service control information.

[Fourth Embodiment]

The fourth embodiment adds the abovmentioned embodiments, a structure for facilitating position retrieval of information in the distributed image database.

With the distributed image database realized by the WWW as described above, image describing language such as HTML and the like is used for storing image information. On such an image database is written storage position of image information related to the image information itself stored therein. It is thus possible to retrieve desired image information by using the input/output function of a computer terminal. On the other hand, if a user does not know the storage position of desired image information, it is possible to retrieve the storage position by using, for example, a directory service page (meta index) such as Yahoo, NTT directory and the like.

On the contrary, when a distributed image database using the WWW described above is retrieved by facsimile terminals, normally there is no symbol indicating the content type of the image information in the data stored in the WWW. Therefore, in order to provide similar services like Yahoo, NTT directory and the like, it is necessary to perform retrieval by hand, determine the content type of the image information, and register the image information in the directory service. However, there is a limitation in confirming all the image information, since the volume is too large to do this by hand. In addition, there is another problem in that control of the directory service becomes troublesome.

The object of the present embodiment is therefore, to create, store, and update the directory information for retrieval of information by facsimile terminals by using cache, or programs which perform retrieval autonomously at the time of retrieval, to thereby make the control of directory service simple without retrieving and storing the information for directory service by hand, and without sending and registering the information for directory service to the providers of specific directory services.

An actual example of secondary service control information used in the present embodiment will first be described with reference to FIG. 12. In order to constitute an image database which can be retrieved by facsimile terminals on a distributed image database using the WWW, it is only necessary to define an identifier such as FAXSCRIPT in a part of image describing language such as HTML shown in FIG. 12, and write the operation procedure indicating the facsimile response procedure, as secondary service control information therein. In this secondary service control information, there is written image information or voice guidance information to be sent out to facsimile terminals and which is required for retrieval of image information related thereto, and execution information indicating which operation should be taken for the response using the PB signal in response thereto.

Figure 14:
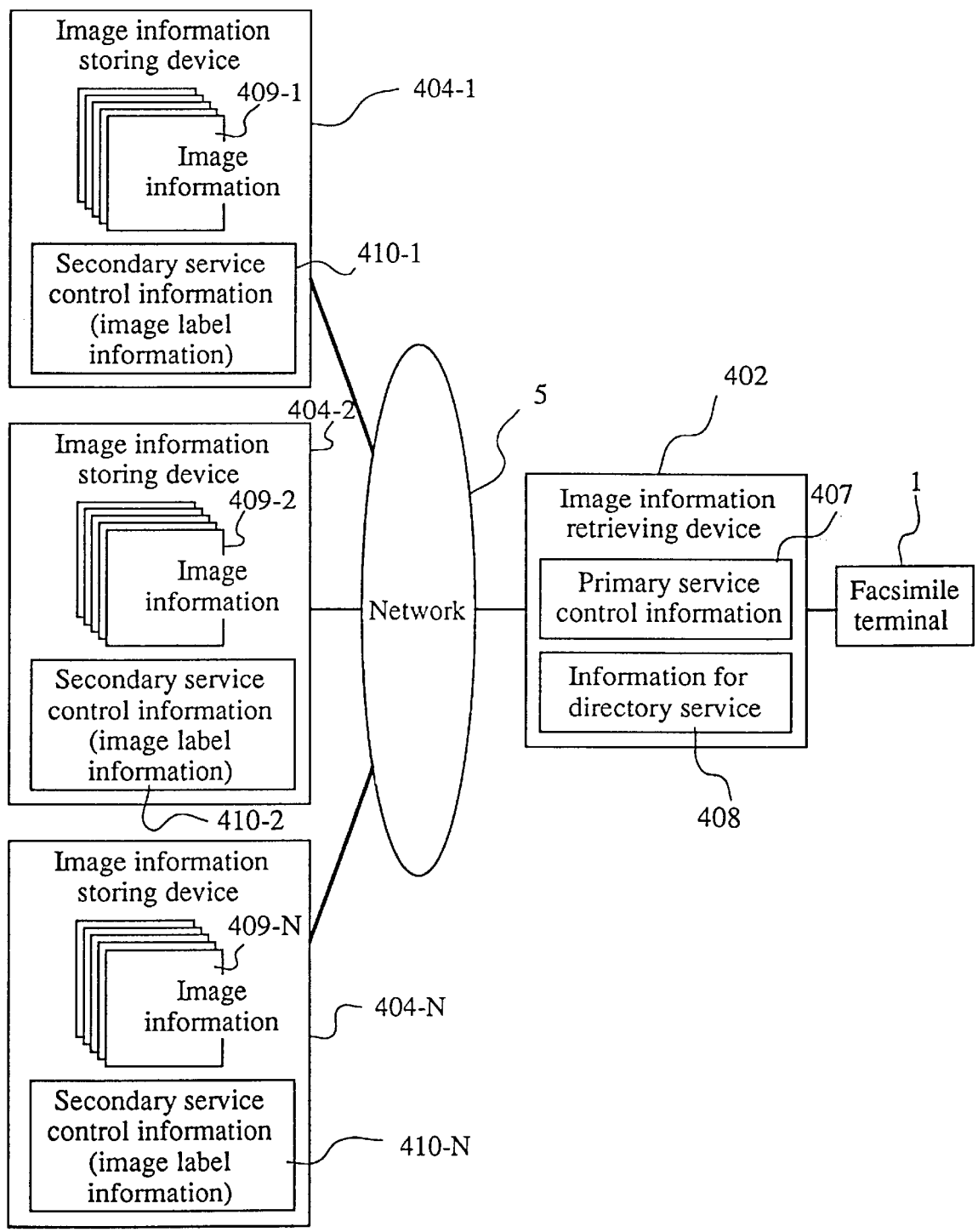
FIG. 14 is a diagram showing an example of a system structure of a distributed image database including the image information retrieving device of the fourth embodiment.

FIG. 14 shows an example of a system structure of a distributed image database using facsimile terminals corresponding to the image information-retrieving device of the present embodiment. As shown in FIG. 14, primary service control information 407 and information for a directory service 408 are stored in an image information-retrieving device 402. The information for the directory service 408 is cached, or is created, stored and updated at the time of retrieval by using a program shown in a modified example (FIG. 15) of the present embodiment described later, which performs retrieval autonomously. Secondary service control information (image label information) (410-1~410-N) is stored dispersedly on other information processing devices (in FIG. 14, image information storing devices 404-1~404-N). Thereby, users can perform retrieval by utilizing the directory service at the time of retrieval of the distributed image database from the facsimile terminal 1.

Figure 11:
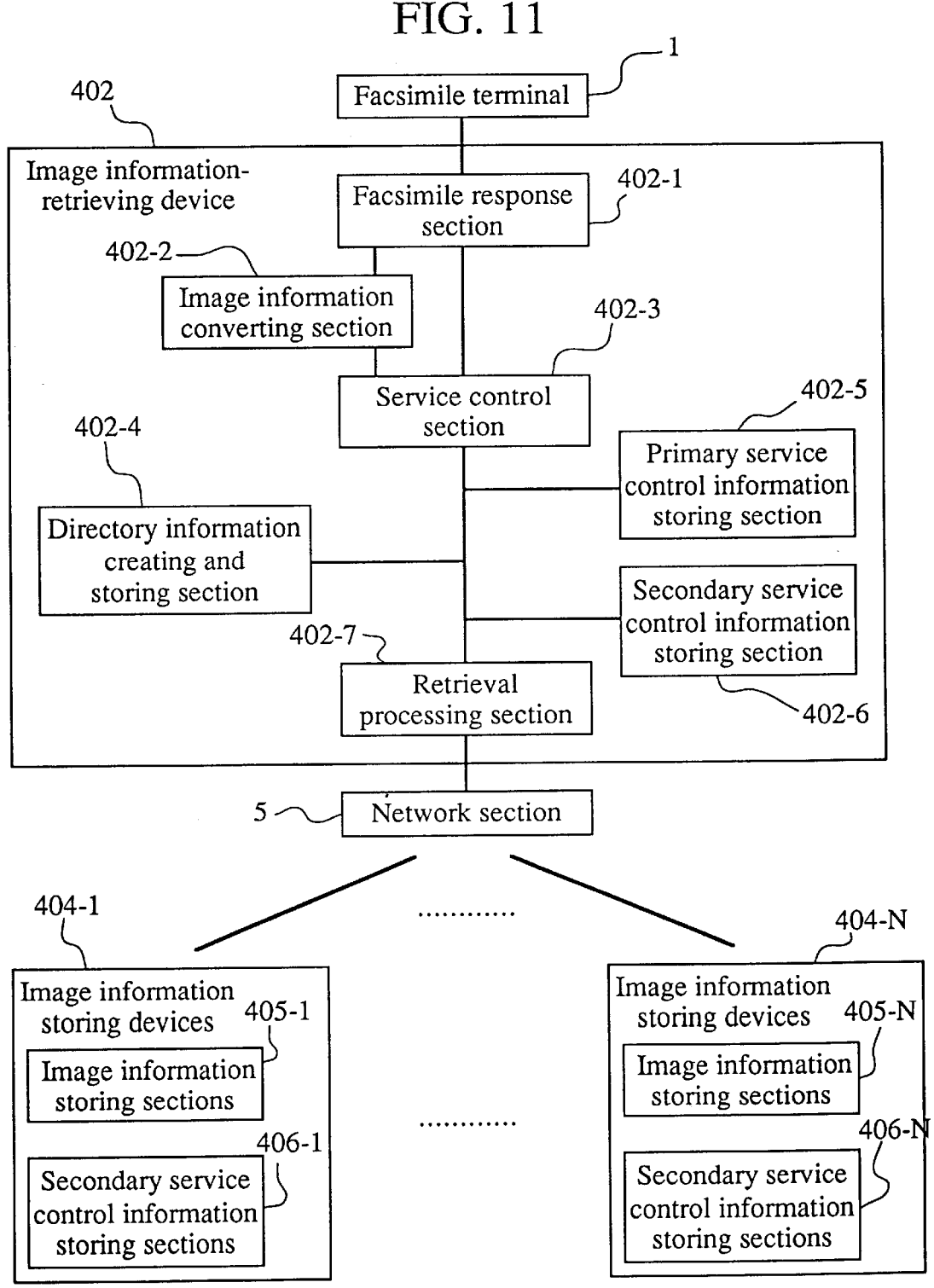
FIG. 11 is a diagram showing an example of a system structure of a distributed image database including the image information retrieving device, which is a fourth embodiment of the present invention.

FIG. 11 shows a system structure of a distributed image database using facsimile terminals including the image information retrieving device 402 of the fourth embodiment. The system of the distributed image database using facsimile terminals comprises; a facsimile terminal 1, an image information-retrieving device 402, a network section 5, and image information storing devices (404-1~404-N). The image information-retrieving device 402 comprises; a facsimile response section 402-1, an image information converting section 402-2 for converting image information to a form which can be output to facsimile terminals, a service control section 402-3, a directory information creating and storing section 402-4, a primary service control information storing section 402-5, a secondary service control information storing section 402-6, and a retrieval processing section 402-7.

In the primary service control information storing section 402-5, primary service control information 407 is stored in advance, and in the primary service control information 407, facsimile response procedures are written in advance. Furthermore, in the distributed image storing devices (404-1~404-N), image information (409-1~409-N) is stored in image information storing sections (405-1~405-N), and secondary service control information (410-1~410-N) is stored in secondary service control information storing sections (406-1~406-N). It is assumed that image label information is written in a part of the secondary service control information (410-1~410-N), as shown in FIG. 12. Image label information is written by the information sender.

The operation of the fourth embodiment will now be described with reference to FIG. 11. The facsimile response section 402-1 is accessed from the facsimile terminal 1. Upon accessing, the facsimile response section 402-1 sends a service start signal to the service control section 402-3. Upon receipt of the start signal, the service control section 402-3 reads out primary service control information 407 from the primary service control information storing section 402-5, and outputs voice information to the facsimile response section 402-1 according to the written service control information. The facsimile response section 402-1 converts the voice information to an aural signal and outputs the aural signal to the facsimile terminal 1. On the facsimile terminal 1 side, the user hears voice information as shown in FIG. 13A, and inputs a desired service number using the PB sound. The facsimile response section 402-1 receives the PB sound, converts the PB sound to the corresponding number, and outputs the number to the service control section 402-3. The service control section 402-3 executes a command according to execution information written in the primary service control information 407.

At a stage where no retrieval is performed, since information for the directory service 408 is not stored in the directory information creating and storing section 402-4, the directory service is not available. Therefore, at the initial stage of use, retrieval is performed by, for example, a method involving inputting a storage position of the image information by a number (in FIG. 13A, for example, the 2# service). When the storage position of information is input, retrieval and reading in of the specified image information (409-1~409-N) and the secondary service control information (410-1~410-N) in the image information storing devices (404-1~404-N) is performed by the retrieval processing section 402-7 via the network section 5.

The obtained secondary service control information (410-1~410-N) is temporarily stored in the service control information storing section 402-6, and then output to the service control section 402-3. The service control section 402-3 executes commands according to the written service control information. At this time, when image label information which can be confirmed by identifiers shown in FIG. 12 is contained in the secondary service control information (410-1~410-N) temporarily stored, the directory information creating and storing section 402-4 cuts out the image label information and the storage position of the image information (409-1~409-N) and stores them as retrievable information for the directory service 408 corresponding to the service control. A single or plural number of users duplicate the retrieval, thereby creating information for the directory service 408.

When the desired image information (409-1~409-N) is detected by repeating the command and execution according to the service control, the obtained image information (409-1~409-N) is output to the image information converting section 402-2. The image information converting section 402-2 converts the image information (409-1~409-N) to a style transmittable to a facsimile, and transmits the image data to the facsimile terminal 1.

By the operation described above, the operator can obtain the desired image information (409-1~409-N), while information for the directory service 408 is created in the image information-retrieving device 402, and the result is stored in the directory information creating and storing section 402-4.

Next, a description will be given for the case where a directory service is utilized. When a directory service is utilized in the primary service control information storing section 402-5, guidance is spoken by utilizing information for the directory service 408 which has been created heretofore, as shown in the guidance information 1# in FIG. 13. The depth of hierarchy of the guidance and content types which can be specified, can be defined and changed by the administrator of the image information-retrieving device 402.

At the point when the desired image information (409-1~409-N) is found, by inputting a number corresponding to the image information (409-1~409-N) using the PB sound, the image information (409-1~409-N) on the distributed image database is retrieved. If the secondary service control information (410-1~410-N) is retrieved, the same operation as described above will be performed.

Figure 15:
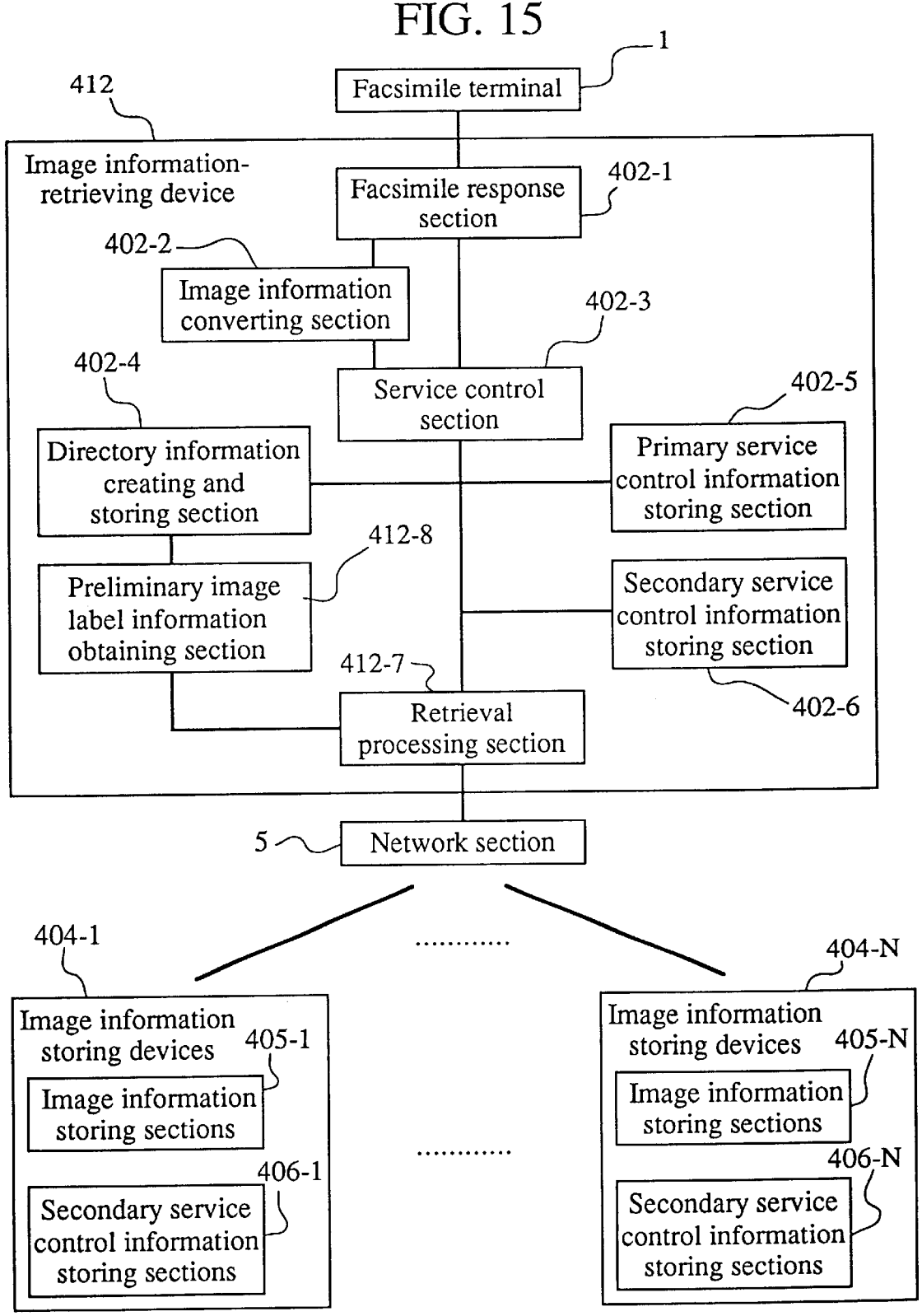
FIG. 15 is a diagram showing a structure of a modified example of the fourth embodiment of the present invention shown in FIG. 11.

Next, a modified example of the fourth embodiment will be described with reference to FIG. 15. FIG. 15 shows the structure of an image information-retrieving device 412 as a modified example of the image information-retrieving device 402 of the fourth embodiment shown in FIG. 11. As shown in FIG. 15, the difference with the fourth embodiment is the addition of a preliminary image label information-obtaining section 412-8.

The operation of this embodiment will now be described. With the fourth embodiment, at a stage where no retrieval is performed, since the information for the directory service 408 is not stored in the directory information creating and storing section 402-4, the directory service is not available. With this embodiment therefore, by using the preliminary image label information obtaining section 412-8, the program autonomously retrieves the distributed image database at regular intervals via the retrieval processing section 412-7 (Robots are known for such a technology. See literature: Bots and other internet beasties, Smas. net Publishing, Joseph Williams, 1996), detects the image information with the image label information (409-1~409-N), creates information for the directory service 408 for information retrieval, and stores the result in the directory information creating and storing section 412-4. Hence, even if at a stage where no retrieval by users is performed, information for the directory service 408 can be stored. Retrieval of the image information (409-1~409-N) is the same as for the fourth embodiment shown in FIG. 11.

As described above, according to this embodiment, it becomes possible to create directory information for information retrieval by facsimile terminals, without the retrieval and storage of information for directory retrieval by hand. Therefore, there is no need to transmit or register the information for the directory service to providers of a specific directory service, and respective information providers can control the information dispersedly. Hence this embodiment has the effect of making the control of the directory service simple.

Furthermore, the program autonomously retrieves the distributed image database at regular intervals to detect image information with image label information, and creates information for the directory service for information retrieval, and stores the result in the directory information creating and storing section. Hence this embodiment has the effect that even if at a stage where no retrieval by users is performed, information for directory service can be stored.

[Fifth Embodiment]

With the above embodiment, as an actual example of secondary service control information, there is shown a method where a service control procedure is written by mixing voice information representative of voice guidance to be sent out to facsimile terminals, and execution information showing, when a user specifies using the PB a number showing the response to the voice guidance, which operation should be taken. When a service is carried out according to such a service control procedure, there is a problem as to how to convert the voice guidance written in the service control information to voice information, and how to send this out to facsimile terminals. Namely, if the voice guidance is written in the service control information as voice information such as PCM and the like, the size of the service control information becomes huge. Therefore, the time to read the secondary service control information into the image information-retrieving device via the network becomes considerable. Furthermore, there can be a method to write the voice guidance in the service control information as text information and convert the information to voice information, as required, by speech synthesis. In this case, the data volume of secondary service control information becomes much less and the time required for read in becomes brief. However, there is a problem in that not only does the processing time required for speech synthesis becomes considerable, but also the quality of the voice information formed by the speech synthesis becomes very poor compared to the actual voice, and if all voice guidance is formed by speech synthesis, it is difficult to be heard.

Under the above background, therefore, with distributed image database retrievable from facsimile terminals, in the image database using a dynamic service control procedure in which even if a number of people add or delete image information separately at an optional time, it is not necessary to rewrite the service control procedure in the image information retrieving device every time, the object of the present embodiment is to provide an image information retrieving device, wherein the time required for read in of secondary service control information in which the dynamic service control procedure is written and the processing time are brief, and a high quality of voice guidance can be provided.

Figure 16:
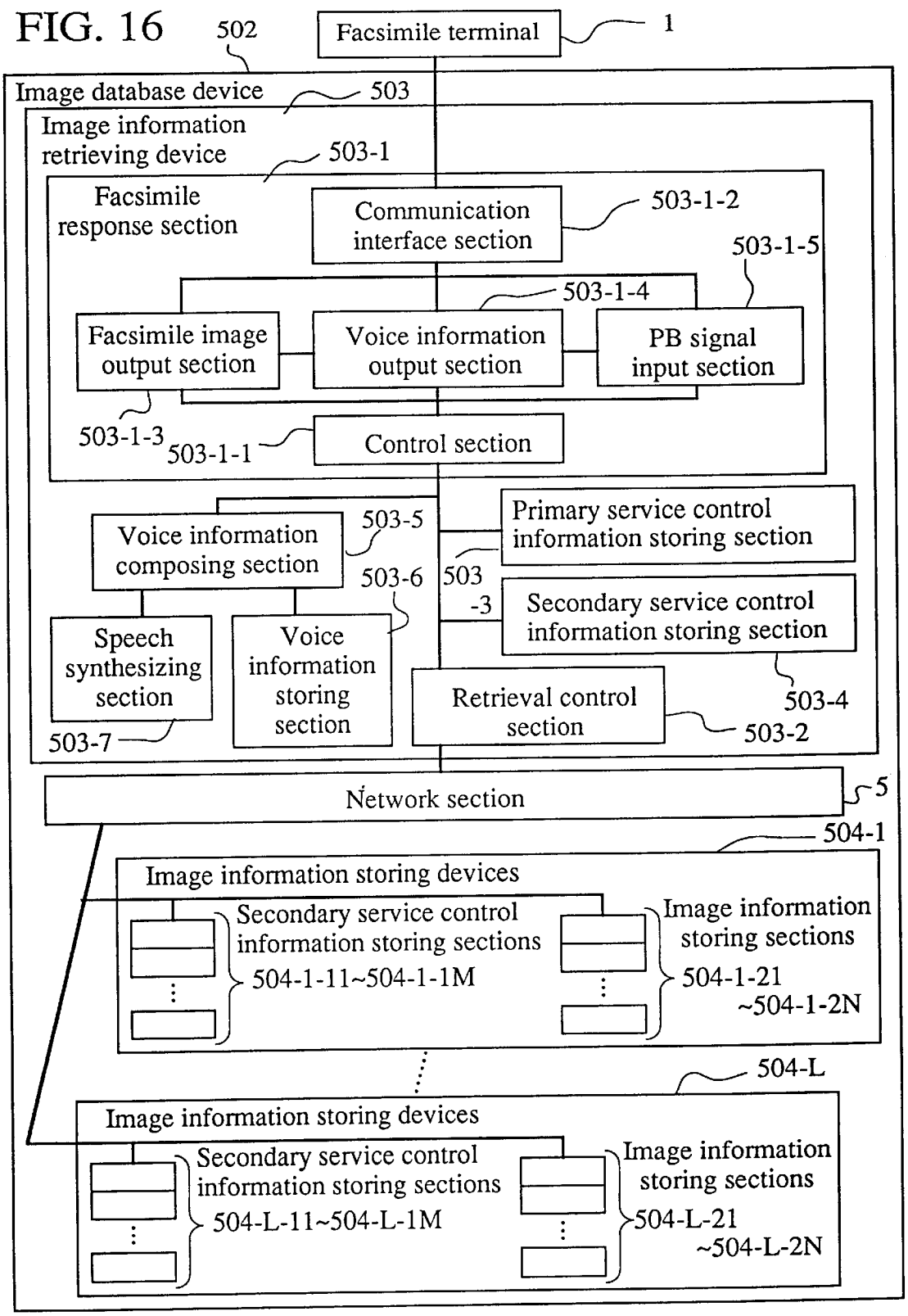
FIG. 16 is a system structural diagram for explaining one embodiment of an image information retrieving device of a fifth embodiment of the present invention.

FIG. 16 is a system structural diagram showing the present embodiment. In FIG. 16, a facsimile terminal 1 is connected to an image database device 502. The image database device 502 comprises; an image information-retrieving device 503 connected to the facsimile terminal 1, a plurality of image information storing devices 504-1~504-L which constitute a distributed image database, and an image network section 5 for connecting dispersedly arranged image information storing devices 504-1~504-L and image information-retrieving device 503. Furthermore, the image information-retrieving device 503 comprises; a facsimile response section 503-1, a retrieval processing section 503-2, a primary service control information storing section 503-3, a secondary service control information storing section 503-4, a voice information composing section 503-5, a voice information storing section 503-6 and a speech synthesizing section 503-7. The facsimile response section 503-1 comprises; a control section 503-1-1, a communication interface section 503-1-2, a facsimile image output section 503-1-3, a voice information output section 503-1-4, and a PB signal input section 503-1-5. In addition, the image information storing devices 504-1~504-L comprise; secondary service control information storing sections 504-1-11~504-1-1M, . . . , 504-L-11~504-L-1M, and image information storing sections 504-1-21~504-1-2N, . . . , 504-L-21~504-L-2N.

Primary service control information is stored in advance in the primary service control information storing section 503-3, voice information with expressions which are used frequently in the voice guidance is stored in the voice information storing section 503-6, in such a form that it can be retrieved by identification symbols, secondary service control information is stored in advance in the secondary service control information storing sections 504-1-11~504-1-1M, . . . , 504-L-11~504-L-1M, and image information is stored in advance in the image information storing sections 504-1-21~504-1-2N, . . . , 504-L-21~504-L-2N.

In order to operate this device, the telephone line is first connected from the facsimile terminal 1 to the communication interface section 503-1-2. Upon connection of the telephone line, the communication interface section 503-1-2 outputs a service start request signal to the control section 503-1-1. Upon input of the service start request signal, the control section 503-1-1 reads out primary service control information from the primary service control information storing section 503-3, and outputs the voice guidance information written in the service control information to the voice information composing section 503-5. When the voice guidance information contains a voice information identification symbol, the information composing section 503-5 reads out the voice information corresponding to the voice information identification symbol from the voice information storing section 503-6. When the voice guidance information contains text information for speech synthesis, the information composing section 503-5 outputs the text information for speech synthesis to the speech synthesizing section 503-7. The speech synthesizing section 503-7 forms synthesized voice information from the text information for speech synthesis, and outputs the information to the voice information composing section 503-5. The voice information composing section 503-5 composes a single piece of voice information by putting the voice information read out from the voice information storing section 503-6 and the synthesized voice information output from the speech synthesizing section 503-7 in the order of description in the voice guidance information, and outputs the single piece of voice information to the control section 503-1-1.

The control section 503-1-1 outputs the voice information to the voice information output section 503-1-4. The voice information output section 503-1-4 converts the voice information to an aural signal which can be heard by phone, and outputs the aural signal to the facsimile terminal 1 via the communication interface section 503-1-2. On the facsimile terminal 1 side, the user receives the aural signal, and inputs a number corresponding to the response using the PB of the facsimile terminal 1. The facsimile terminal 1 outputs the PB signal corresponding to the PB to the communication interface section 503-1-2. Upon input of the PB signal, the communication interface section 503-1-2 outputs the PB signal to the PB signal input section 503-1-5. The PB signal input section 503-1-5 converts the PB signal to number information corresponding thereto, and outputs the number information to the control section 503-1-1.

Upon input of the number information, the control section 503-1-1 outputs the storage address information of the corresponding secondary service control information to the retrieval processing section 503-2, according to the corresponding execution information of the primary service control information. The retrieval processing section 503-2 reads out the secondary service control information from the secondary service control information storing sections 504-1-11~504-1-1M, . . . , 504-L-11~504-L-1M on the image information storing devices 504-1~504-L shown by the storage address information via the network section 5, and temporarily stores the image information in the secondary service control information storing section 50-34 of the image information-retrieving device 503.

The control section 503-1-1 reads out the secondary service control information stored in the secondary service control information storing section 503-4, and outputs the voice guidance information written in the secondary service control information to the voice information composing section 503-5. When the voice guidance information contains a voice information identification symbol, the information composing section 503-5 reads out the voice information corresponding to the voice information identification symbol from the voice information storing section 503-6. When the voice guidance information contains text information for speech synthesis, the information composing section 503-5 outputs the text information for speech synthesis to the speech synthesizing section 503-7. The speech synthesizing section 503-7 forms synthesized voice information from the text information for speech synthesis, and outputs the information to the voice information composing section 503-5. The voice information composing section 503-5 composes a single piece of voice information by putting the voice information read out from the voice information storing section 503-6 and the synthesized voice information output from the speech synthesizing section 3-7 in the order of description in the voice guidance information, and outputs the single piece of voice information to the control section 503-1-1.

The control section 503-1-1 outputs the voice information to the voice information output section 503-1-4. The voice information output section 503-1-4 converts the voice information to an aural signal which can be heard by phone, and outputs the aural signal to the facsimile terminal 1 via the communication interface section 503-1-2.

On the facsimile terminal 1 side, the user receives the aural signal, and inputs a number corresponding to the desired response using the PB of the facsimile terminal 1. The facsimile terminal 1 outputs a PB signal corresponding to the PB to the communication interface section 503-1-2. Upon input of the PB signal, the communication interface section 503-1-2 outputs the PB signal to the PB signal input section 503-1-5. The PB signal input section 503-1-5 converts the PB signal to number information corresponding thereto, and outputs the number information to the control section 503-1-1.

Upon input of the number information, the control section 503-1-1 outputs the storage address information of the corresponding image information to the retrieval processing section 503-2, according to execution information of the secondary service control information. The retrieval processing section 503-2 reads out the image information stored in the image information storing sections 504-1-21~504-1-2N, . . . , 504-L-21~504-L-2N on the image information storing devices 504-1~504-L shown by the storage address information via the network section 5, and outputs the image information to the control section 503-1-1. Upon input of the image information, the control section 503-1-1 outputs the image information to the facsimile image information output section 503-1-3. The facsimile image information output section 503-1-3 encodes the image information for facsimile, and outputs the code to the facsimile terminal 1 via the communication interface 503-1-2.

Having such a structure, the present embodiment can suppress the data volume of secondary service control information and the processing volume required for speech synthesis processing to a minimum, in the image information-retrieving device which reads the secondary service control information corresponding to a plurality of facsimile information services dynamically into the image information-retrieving device 503, and executes a facsimile information service according to the secondary service control information.

An actual example of a facsimile information service according to the above embodiment will now be described. FIGS. 17A~C show one example of a facsimile information service written by mixing synthesized voice and stored voice, and FIG. 18 is a diagram showing an example of the service processing flow thereof.

Primary service control information is written, for example, as shown in FIG. 17A, and secondary service control information is written, for example, as shown in FIG. 17B. Here, voice guidance information is expressed by a mixture of identification symbols of voice information which are stored in the voice information storing section in the image information-retrieving device in advance, as shown in FIG. 17C, and which are frequently used, and text information for speech synthesis.

First, when a telephone line is connected from a facsimile terminal to the image information-retrieving device (1), primary service control information is first read in (2), and the voice information corresponding to the voice information identification symbol written in the voice guidance information A which has been already stored therein (in this case, "This is XXX facsimile information service. For weather information, press 1#, for traffic information, press 2#") is sent out to the facsimile terminal (3). The user then inputs a number corresponding to the selection item indicated by the voice guidance (in this case, "1#") using the PB. The facsimile terminal then transmits the PB signal to the image information retrieving device (4), and the image information retrieving device converts the inputted PB signal to a number, and determines the operation to be performed next, referring to the execution information A corresponding to this number. In this case, "1#" is input, therefore, the image information retrieving device reads in the secondary service control information stored in a storage address a, and performs service control according thereto (5).

In this service control, the voice information retrieved from the identification symbol of the voice information written in the voice guidance information A', and the synthesized voice information which has been converted from text information for speech synthesis are put in the order of description to form a single piece of voice information A'. The voice information A' is then sent out to the facsimile terminal (6). In this case, the voice guidance saying, "This is weather information service. For weather information in Kanto area, press 1#, for weather information in Tokai area, press 2#", is sent out. When the user presses "2#" using the PB, the PB signal is sent out from the facsimile terminal 1 (7). The image information retrieving device then converts the PB signal to a number, and determines the operation to be performed next, referring to the execution information A'. Namely, in this case, the image information retrieving device reads out image information stored in a storage address ω (8) and sends this out to the facsimile terminal (9).

With such a structure, typical expressions which are used frequently are stored in advance as voice information in the image information-retrieving device, and only the voice information specific to the facsimile information service and of minimum requirement is synthesized as synthesized voice information. Thereby, data volume of the secondary service control information can be suppressed to a minimum, and the processing volume required for speech synthesis processing which is required by the image information-retrieving device, can be also suppressed to a minimum.

Therefore, it becomes possible to dynamically read secondary service control information corresponding to a plurality of facsimile information services into the image information-retrieving device, and suppress the time for read in and the time for processing to a minimum at the time of execution thereof. Furthermore, since speech synthesis can be suppressed to a minimum, the quality of voice information can be kept high.

According to the present embodiment, in the image information-retrieving device which operates according to the service control procedure, since the time for read in of the secondary service control information and the time required for speech synthesis processing are suppressed to a minimum, the resultant effect is that the waiting time of the user on the facsimile terminal side is made a minimum and the quality of the voice information can be kept high.

[Sixth Embodiment]

With a sixth embodiment, for example, service control script is written between an initiation identifier [<SCRIPT LANGUAGE="Service Script">] and a termination identifier [</SCRIPT>] as secondary service control information, in a part of an HTML file on the WWW which is to be retrieved. FIG. 19 shows an example of the description. By designating the identifier as [<SCRIPT LANGUAGE=\*\*\*>...</SCRIPT>] as in this example, it is not displayed on the screen in a Browser such as Netscape (R) (unsupported tag is not displayed). Furthermore, the service control information (service control script) describing the service control procedure is written in a part of the HTML, rather than in a facsimile utilizing type WWW retrieving device, so that a number of homepage producers can add and delete guidance information and service control information which is the procedure of the operation for the PB input for every homepage at an optional time. Hence distributed control of service control information becomes possible.

Figure 20:
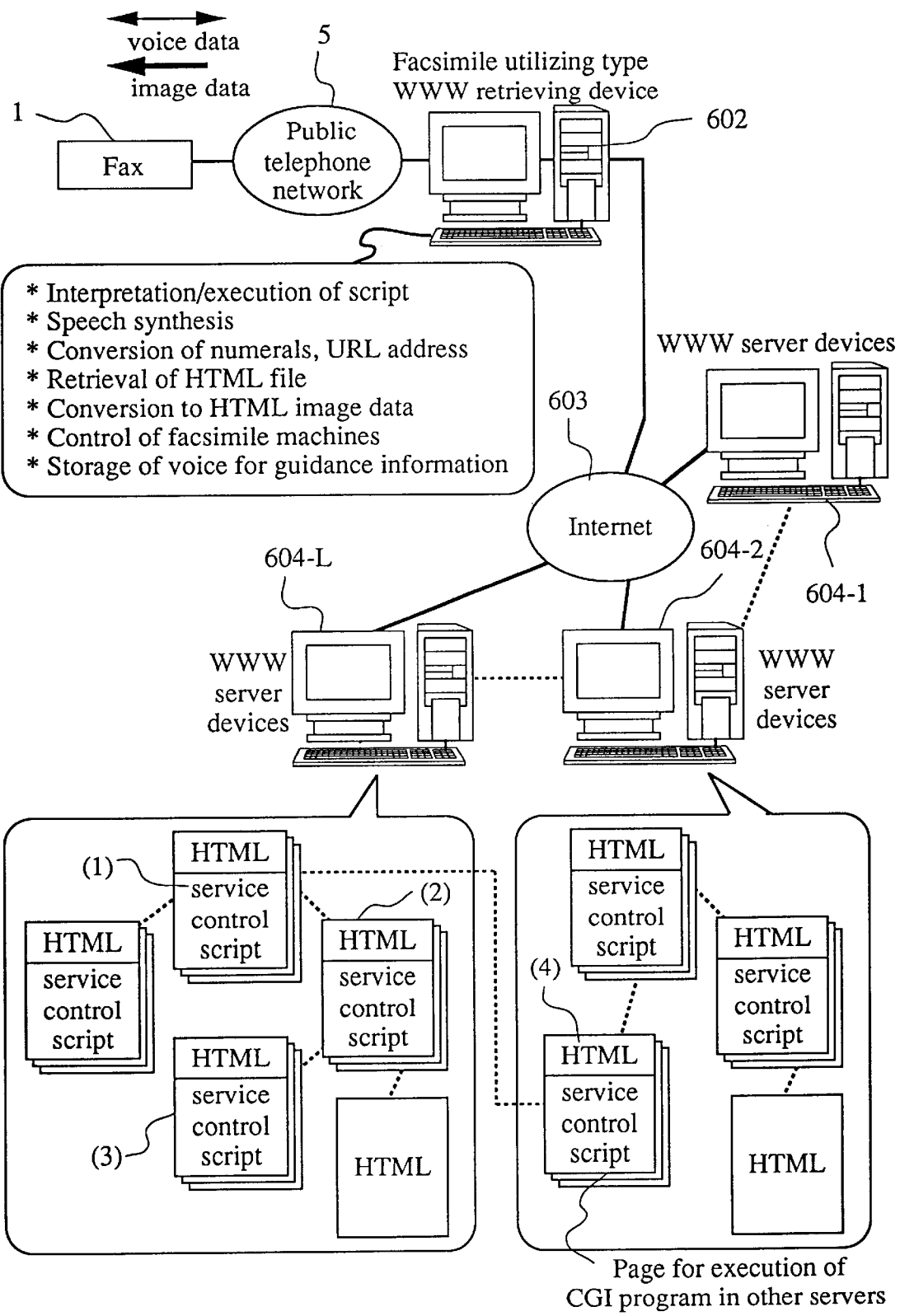
FIG. 20 is a diagram showing a structure of an image database in the sixth embodiment.

FIG. 20 shows a structure of the image database of this embodiment. The service control procedure will not be performed by only describing the service control script in a part of HTML file. Therefore, as shown in FIG. 20, the facsimile utilizing type WWW retrieving device 602 (corresponding to the image information-retrieving device of respective embodiments) is provided with a script analyzing and executing section such as an interpreter which interprets and executes the service control script. When the user inputs a numeral code corresponding to a URL address of an optional homepage to retrieve a desired homepage, it is determined whether there is a service control script between the initiation identifier [<SCRIPT LANGUAGE="I/m Script">] and the termination identifier [</SCRIPT>] in the HTML file retrieved by the facsimile utilizing type WWW retrieving device 602. If there is a service control script therebetween, the script-interpreting and executing section of the facsimile utilizing type WWW retrieving device 602 has only to extract between two identifiers, and execute the service control procedure.

By this method, the script-interpreting and executing section has only to be in the facsimile utilizing type WWW retrieving device 602, and the service control script has only to be written on the server dispersedly arranged. In addition, since the voice information which is to be the guidance information can be specified in the service control script, voice guidance made for every homepage can be changed.

Incidentally, one method is to specify the voice guidance information of a plurality of patterns stored in the facsimile utilizing type WWW retrieving device in advance, and since there is no need to send the voice data from the WWW server to the facsimile utilizing type WWW retrieving device, the voice guidance can be made at very high speed. However the type of voice guidance is restricted.

On the other hand, with a method where the voice data file to be sent to the facsimile utilizing type WWW retrieving device from the WWW server is specified in the service control script, the voice file to be reproduced can be freely set. However, a long period of time is required to retransmit the voice data file from the WWW server to the facsimile utilizing type WWW retrieving device. Therefore, in this embodiment, in addition to these methods, a text character string describing the content of the voice guidance is written between identifiers, such as " " " " and the like in the service control script. Then when the service control script is executed, the speech synthesizing section 602-8 (see FIG. 23) in the facsimile utilizing type WWW retrieving device 602 performs speech synthesis to convert the text character string to voice.

By using this method, the voice guidance can be freely changed even in a distributed environment, and at the time of retransmittance from the WWW server to the facsimile utilizing type WWW retrieving device 602, only the text character string has to be transmitted. Hence the voice guidance information can be sent at a high speed. The text character string in " " after each index number in FIG. 19 are the description examples.

Furthermore, as indicated in the conventional technical problems (5), the CGI on the WWW cannot be executed in conventional devices. This embodiment has a device for temporarily holding plural parameters selected by PB input and execute the CGI program as a restricted condition of the obtained plural parameters.

Figure 24:
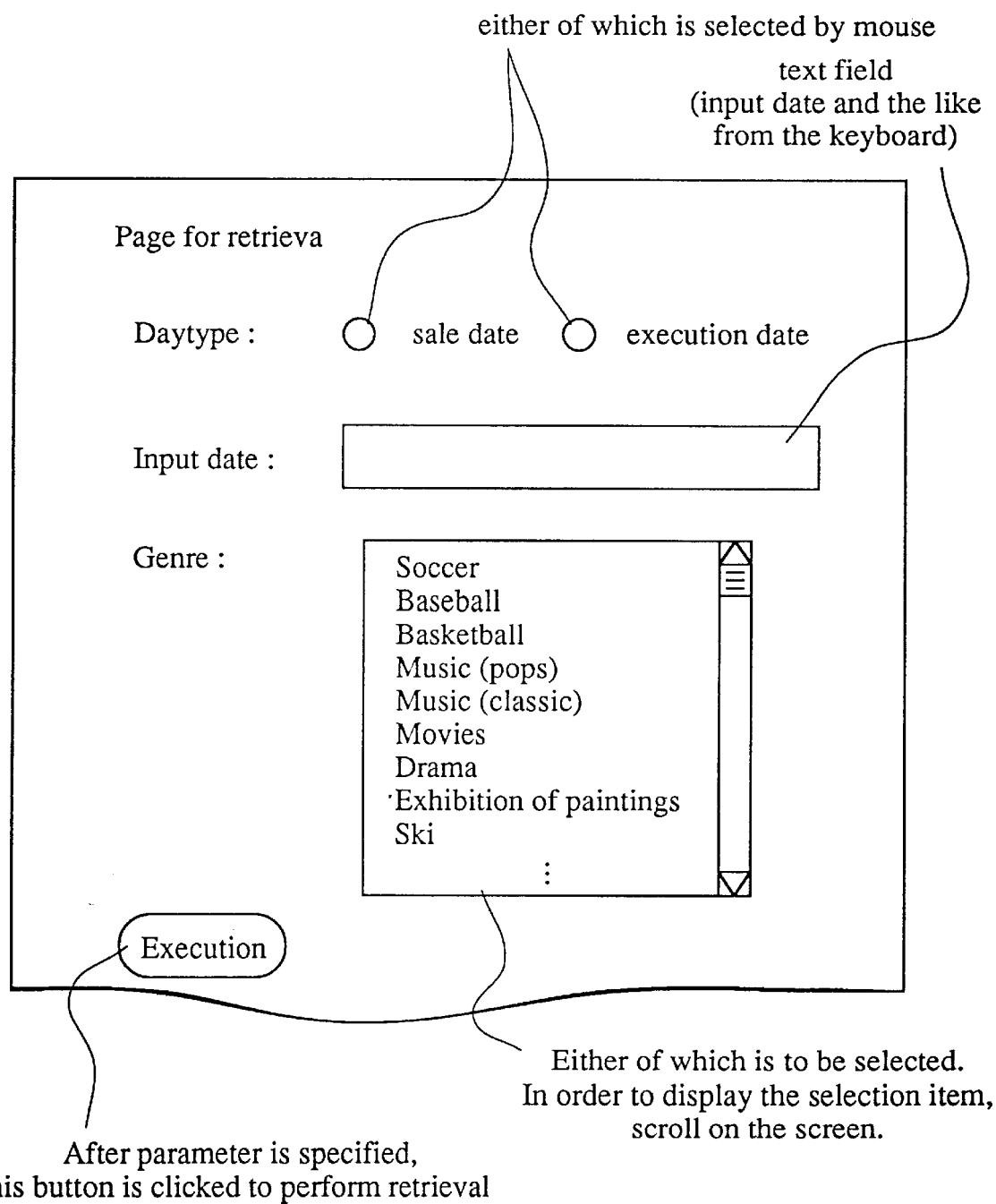
FIG. 24 is a diagram showing a case where a home page including CGI is output.

More specifically, assume that there is a homepage utilizing a CGI as shown in FIG. 24. FIG. 21 shows one example of the source of the page shown in FIG. 24. The portion between <FORM> and </FORM> is the part where button, text field and select box are displayed. Between <FORM> and </FORM>, there are also written variables into which a selected or inputted value is put, and program names to execute each variable as argument.

In the example of FIG. 21, the names of variables are daytype, day, and genre, and the name of the program to be executed is:

In order to make it possible to use the same CGI program from the facsimile utilizing type WWW retrieving device 602, service control script is written as described in italic type in FIG. 21.

FIG. 22 shows a correspondence table of parameters which the user already has and numeral codes. It is assumed that users have the correspondence table shown in FIG. 22 in advance. When there is a page to execute CGI, as shown in FIG. 21, with service control script, selection of parameters is performed by inputting each parameter code using the PB in accordance with the voice information. For example, when the user wants to retrieve "classic concert held on Feb. 11, 1997", the user inputs "1#970211#5#" according to the voice guidance to select the parameter. At this time, the script-interpreting and executing section temporarily holds the selected value, and executes the CGI program specified by ACTION=based on the specified parameter. The executed CGI program may be specified to be the same for the computer and for the facsimile terminal utilizing type WWW retrieving device.

For example, by writing service control script in a part of HTML, as shown in FIG. 21, the CGI program on the WWW can be executed by the facsimile terminal utilizing type WWW retrieving device.

Furthermore, when the HTML file (3) in FIG. 20 is to be taken out, in the conventional device, it has been required to make a call three times. However, by using the arrangement described above, HTML files of (1) and (2) are retrieved according to the voice guidance written in the service control script, and only the HTML file (3) is output to a facsimile. Hence the time required for retrieval can be shortened.

With the present embodiment, it is assumed that the target of the service control is a facsimile terminal having an input/output function, and that input is numeral by means of a PB signal, and data to be sent out is voice or image for facsimile. By assuming input and output to be as described above, and by appending a number in an index style to the head of each command, coordinating the last number of each index to the PB input number to describe the control structure corresponding to conditional branch, and specifying the guidance information to be output to the facsimile terminal by a text character string placed between the initiation identifier and the termination identifier, it becomes possible to describe service control information having a control structure corresponding to the conditional branch, without declaring the variable in advance and without using an IF sentence.

With the present embodiment, interpretation and execution of the service control script written by the above-mentioned method is performed. Description examples of service control information are shown in FIG. 19 and FIG. 21. The numeral in [ ] is the index number, and the guidance information is written, for example, in the text character string between identifiers " ". For example, if PB 2 is pressed while outputting voice guidance "~" of [1], a command of [1-2] is executed. If PB 1 is pressed while reproducing voice guidance "~" of [1-2], a command of [1-2-1] is executed. Thus, the control structure corresponding to the PB input can be written.

As shown in FIGS. 19 and 21, in the service control script, service control information is written in an index style by mixing voice information representing the voice guidance to be sent out to facsimile terminals and execution information representing which operation should be taken when the user specifies a number showing a response to the voice guidance using the PB. The service control script is written in an index style, and a service control script located in an other storage position can be specified subsequent to the service control information in, for example, storage position (1). For example, in the example shown in FIG. 19, subsequent to the command of [1-3], not only retrieval of image information, but also a script located in an other storage position as shown in FIG. 21 are specified to be continued following the service control being now executed. Since the service control script can be written in a hypertext format, the administrator does not have to grasp the whole service control procedure, and partial change becomes easy. Namely, on the WWW which is a distributed database, it becomes possible to realize a facsimile terminal utilizing type WWW retrieving device 602 having a script interpreting and executing function, in which there is no need to rewrite the whole service control procedure every time a number of people add or delete the service control procedure separately at an optional time.

Figure 23:
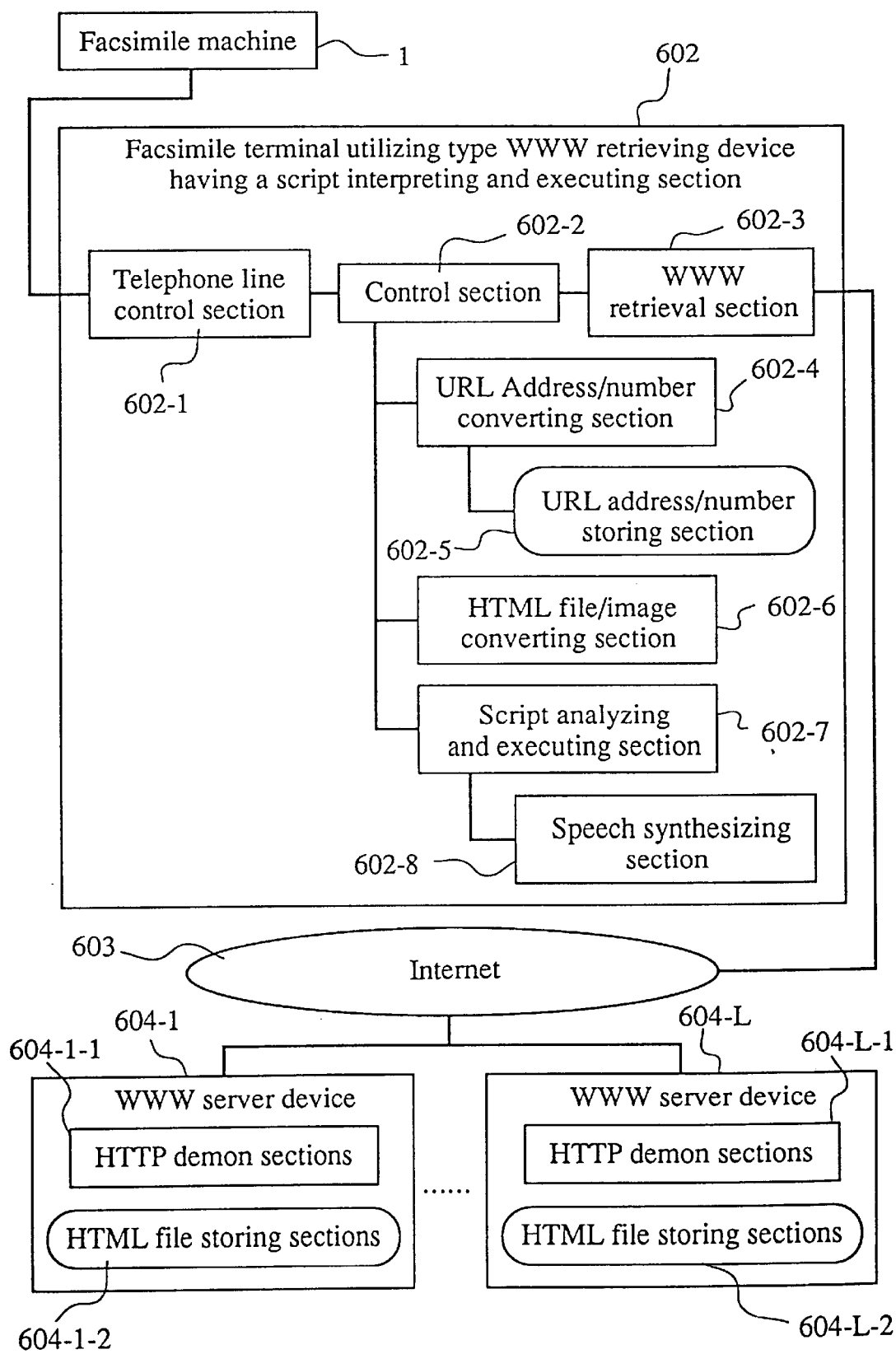
FIG. 23 is a diagram showing a structure of a facsimile terminal utilizing type WWW retrieving device having script interpretation and execution functions in the sixth embodiment.

A specific example of this embodiment will now be described in detail with reference to FIG. 23. FIG. 23 shows a structure of a facsimile terminal utilizing type WWW retrieving device 602 having a script interpreting and executing function according to this embodiment. The system shown in FIG. 23 comprises; a facsimile terminal 1, a facsimile terminal utilizing type WWW retrieving device 602 having a script interpreting and executing function, a network section 5, and WWW server devices 604-1~604-L with servers 604-1~604-L in which HTTP demon section 604-11~1604-L-1 are initialized, and HTML file storing sections 604-1-2~604-L-2 storing a plurality of HTML files built therein.

The facsimile terminal utilizing type WWW retrieving device 602 having a script interpreting and executing function has therein; a telephone line control section 602-1 having a device for controlling response to a telephone line connection, to output voice information, to analyze the PB sound input by a user, and to output image information, a WWW retrieval section 602-3 for retrieving data on the WWW according to HTTP, and a URL address/number converting section 602-4 which extracts a URL address from a HTML file obtained by the WWW retrieval section 602-3, appends a number thereto, stores the information in the URL address/number storing section 602-5, converts the URL address to a number based on the stored information, and converts the number to the URL address. Furthermore, the facsimile terminal utilizing type WWW retrieving device 602 includes therein; the URL address/number storing section 602-5 which appends a number to a URL address extracted by the URL address/number converting section 602-4, and to a URL address already registered therein, and stores them, an HTML file/image converting section 602-6 which analyzes the HTML obtained by the WWW retrieval section 602-3 and converts the HTML to image data to be sent out to facsimile terminals, script analyzing and executing section 602-7 which analyzes and executes service control script extracted by the control section 602-2, a speech synthesizing section 602-8 which converts voice guidance information written in the service control script to audio information which can be output to facsimile terminals, in addition to the telephone line control section 602-1, a WWW retrieval section 602-3, a URL address/number converting section 602-4, an HTML file/image converting section 602-6, and a control section 602-2 for controlling the script analyzing and executing section 602-7.

The operation of the facsimile terminal utilizing type WWW retrieving device 602 having a script interpreting and executing function having a structure described above will now be described.

For example, it is assumed that the file (1) in FIG. 20 is HTML with the service control script of FIG. 19, and the file (4) in FIG. 20 is HTML with the service control script of FIG. 21, and a user wants to retrieve a ticket for soccer held on Feb. 11, 1997 in the file (4) in FIG. 20.

In FIG. 23, the user first makes a call from the facsimile terminal 1 to the facsimile terminal utilizing type WWW retrieving device 602 having a script interpreting and executing function, to connect therewith. In the facsimile terminal utilizing type WWW retrieving device 602 having a script interpreting and executing function, a telephone line control section 602-1 responds and makes voice guidance asking the user to input a numeral code corresponding to the address of a desired homepage. For example, "Please input numeral code and # of desired page", is heard.

In response thereto, the user inputs the numeral code of the desired homepage. In this example, it is assumed that the numeral code of file (1) in FIG. 20 is "2418" and the user inputs "2418#" using the PB sound.

When the PB is input, the facsimile terminal utilizing type WWW retrieving device 602 having a script interpreting and executing function converts the PB sound to numerals in the telephone line control section 602-1 and sends the numeral information to the control section 602-2. The control section 602-2 converts the received numeral code to a URL address by using the URL address/number converting section 602-4, and informs the WWW retrieval section 602-3 to retrieve the HTML file in the received URL address. The WWW retrieval section 602-3 then retrieves the HTML file in the specified URL address and transfers the file to the control section 602-2.

At this stage, if there is no service control script in the HTML file, the HTML file is transferred to the HTML file/image converting section 602-6 to convert the file to image data which can be sent to a facsimile terminal, and transmits the image data to a facsimile machine 1 connected by phone, via the telephone line control section 602-1. Incidentally, the HTML file/image converting section 602-6 retrieves image files, icons and the like required for making an image, and forms image data. Furthermore, the HTML file/image converting section 602-6 extracts a URL address written in the HTML file as a related link, and if it is a URL address which has not been stored, appends a number thereto and stores this in the URL address/number storing section 602-5.

Then, the HTML file/image converting section 602-6 analyzes the HTML file, and if the URL address is new, appends a new number thereto in the vicinity of a word with a related link (for example, to the left thereof), and if the URL address has already been stored in the URL address/ number storing section 602-5, appends a numeral code thereto corresponding to the URL address, to form image data with a number. When the user wants to follow the related link, the user has only to make a call again to the facsimile terminal utilizing type WWW retrieving device 602 having a script interpreting and executing function, and input the numeral code in the vicinity of the link to be followed.

With the present embodiment, the HTML file shown in FIG. 19 is retrieved. In this HTML file, a service control script is written. When the control section 602-2 detects the service control script written in the HTML file, the control section 602-2 extracts the service control script portion, and sends it to the script analyzing and executing section 602-7. The script analyzing and executing section 602-7 performs service control based on the extracted service control script. The script analyzing and executing section 602-7 sends the character string for voice guidance written after the index [1], "Welcome to Kajii's homepage . . . Please input . . . " to the speech synthesizing section 602-8 to perform text speech synthesis, and outputs the voice guidance information to a facsimile terminal via the telephone line control section 602-1. Since data to be retransmitted for voice guidance is a text character string, the voice guidance can be made at high speed.

It is assumed that the user wants to buy a ticket and inputs "3#" to this voice guidance. The PB input is converted to a numeral by the telephone line control section 602-1, and given to the script analyzing and executing section 602-7. In the service control script, the numeral in the last figure of a numeral in the top [ ] corresponds to the input value of the user to the voice guidance, and if 3# is input in the voice guidance of [1], command line [1-3] is executed. By this method, it becomes possible to write the service control procedure with a control structure corresponding to conditional branch, without declaring variables in advance and without using an IF sentence.

In command [1-3], the URL address specifies to retrieve: and the script analyzing and executing section 602-7 makes a request of retrieval to the WWW retrieval section 602-3.

It is assumed that corresponds to the file (4) in FIG. 20 and the HTML file in FIG. 21. The control section 602-2 extracts the service control script written in the retrieved file (4) in FIG. 20 (HTML file in FIG. 21), and sends the service control script to the script analyzing and executing section 602-7. This service control script (file (4) in FIG. 20) is then executed as a continuation of file (1) in FIG. 20. As described above, the service control script can be written in a hypertext format.

In the example of the service control script of the HTML file in FIG. 21, a service control procedure relating to ticket sales is written. For example, only at the first time is "1#" input after the voice guidance of [1], in order to obtain a correspondence table of parameters and codes in a list. In [1-1], a file to be sent as image data is specified, and the file is retrieved via the WWW retrieval section 602-3, converted to image by the HTML file/image converting section 602-6, and output to the facsimile terminal 1 as image data via the telephone line control section 602-1.

A user who has used the function before, inputs "2#" after a voice guidance of [1]. In [1-2], a command to receive parameters of CGI and to execute CGI is written. When a parameter of CGI is selected, the parameter is selected by the PB sound after the voice guidance, and the script analyzing and executing section 602-7 holds the selected parameter.

With the present embodiment, when the user hears the voice guidance saying, "Please input the day type", via the telephone line response section 602-1, and inputs "1#", then the parameter "daytype=a" is held in the script analyzing and executing section 602-7. Then when the user hears the next voice guidance saying, "Please input date", and inputs "970115#" corresponding to the date, the parameter "day= 970115" is held in the script analyzing and executing section 602-7. Then, when the user inputs "11#" corresponding to the genre soccer, after the next voice guidance saying, "Please input genre", then the parameter "genre=11" is held.

Then in a line where the execution command for the CGI is written, the script analyzing and executing section 602-7 sends these three parameters to the program specified by ACTION=via the WWW retrieval section 602-3, to execute the CGI program. The protocol for executing the CGI may be the same as HTTP, and there is no need to prepare a special program for this device. The result of the CGI program on the WWW is returned in a HTML file format. The WWW retrieval section 602-3 sends the HTML file which is the result of retrieval to the control section 602-2. If a service control script is not included in the HTML file, the obtained result is sent to the HTML file/image converting section 602-6 and converted to an image, and the image data is then transmitted and output to the facsimile machine 1 via the telephone line control section 602-1. As described above, by writing service control script in a part of the HTML, the CGI program on the WWW can be executed by the facsimile terminal utilizing type WWW retrieving device 602.

As described above, according to the present embodiment, since the service control information has only to be written on each server, for example, a number of homepage producers can add and delete guidance information and service control information which is the procedure of the operation for the PB input for every homepage at an optional time. Hence distributed control of service control information in service control script becomes possible. In addition, the administrator does not have to grasp the whole service control procedure, and partial change becomes easy. Furthermore, there is the effect that the script analyzing and executing section has only to be in a facsimile terminal utilizing type WWW retrieving device having a script interpreting and executing function, and for example, on the dispersedly arranged server, only service control script has to be written in a hypertext format.

Furthermore, since a text character string having a content of voice information written therein is written in the service control script, being put between identifiers such as " ", and when the service control script is executed, the speech synthesizing section performs speech synthesis to convert the text character string to voice, the for example, for every homepage, voice guidance can be freely changed even in a distributed environment. Moreover, at the time of transmitting from each WWW server to a facsimile terminal utilizing type WWW retrieving device having a script interpreting and executing function, only the text character string is transmitted. Hence voice guidance information can be transmitted at high speed.

In addition, a plurality of parameters selected by PB input are temporarily stored, and a CGI program as a common gateway interface is executed via the WWW retrieval section based on the stored plurality of parameters. Hence there is the effect that a special program for this device does not have to be prepared.

Furthermore, there is the effect that the time for retrieval can be shortened by performing retrieval according to the voice guidance written in the service control script while following the link at the time of retrieval, and outputting only the necessary HTML file to a facsimile.

By appending a number in an index style to the head of each command, coordinating the last number of each index to the PB input number to describe the control structure corresponding to conditional branch, and specifying the guidance information to be output to the facsimile terminal by a text character string placed between the initiation identifier and the termination identifier, it becomes possible to write the service control information with a control structure corresponding to the conditional branch, without declaring variables in advance and without using an IF sentence.

What is claimed is:

1. An image information retrieval system which includes:
a circuit control section (602-1) having means to control response at the time of line connection of a facsimile terminal, to output guidance information which is voice information to a user, to analyze push button signals which a user inputs with a push button, and to output image information to a facsimile terminal,
a WWW retrieving section (602-3) which retrieves data on the WWW server using a URL address, to obtain the appropriate HTML file, a URL address/number converting section (602-4) which converts a specified number to a URL address,
a URL address/number storing section (602-5) which appends a number to a URL address extracted by said URL address/number converting section, and to a URL address already registered therein, and stores them,
an HTML file/image converting section (602-6) which analyzes the HTML file obtained by said WWW retrieving section and converts the HTML to image data to be sent out to facsimile terminals,
a script analyzing and executing section (602-7) for analyzing and executing service control script written in one part of an HTML file,
a synthesizing section (602-8), for converting voice guidance information written in said analyzed service control script to audio information which can be output to facsimile terminals, and
a control section (602-2) serving as said control means for controlling said circuit control section, said WWW retrieving section, said URL address/number converting section, said HTML file/image converting section, and said script analyzing and executing section, and
said control section outputs, upon like connection of said facsimile terminal, guidance information to said facsimile terminal via said line control section according to the service procedure indicated by a primary service control information,
and when said user specifies a number corresponding to a URL address for desired data on the WWW using push button input from said facsimile terminal, converts said number to a URL address using said URL address/number converting section, and executes retrieval of data on the WWW by means of said WWW retrieval section, and executes extraction of service control script from the HTML file of said retrieved data,
and in the case where there is no service control script, converts the HTML file to image information by means of said HTML file/image converting section and then outputs to the facsimile terminal via said line control section, or conveys the fact that there is no service control script to be executed to the facsimile terminal via said line control section by voice information or image information,
and in the case where there is service control script, outputs the guidance information to said facsimile terminal via said line control section in accordance with a service control command in said service control script, and when a user executes push button input from said facsimile terminal in accordance with said guidance information, executes retrieval of data on the WWW via said WWW retrieval section in accordance with the input contents, and converts the HTML file of said retrieved data to image information via said HTML file/image converting section, and then executes control to output to a facsimile terminal via said line control section.

2. An image information retrieval system according to claim 1, wherein said service control script is one in which a number is appended in an index style having a step structure to the head of each command between an initiation identifier and a termination identifier so as to not be displayed when seen from a computer browser, and a control structure corresponding to the conditional branch, and guidance information output to a facsimile terminal in a text character string enclosed by an initiation identifier and a termination identifier, is described by coordinating the last number of each index to the push button input number from the user.

3. An image information retrieval system according to claim 2, wherein said voice guidance information comprises: a description for assigning a voice file, and a description for showing the content of the guidance information as a text character string, and said speech synthesizing section has text speech synthesizing means for converting a text character string to voice, and said text speech synthesizing means extracts guidance information written in service control script, speech synthesizes a text character string written in the contents of said guidance information, and converts this to audio information for output to a facsimile terminal via said control section.

4. An image information retrieval system according to claim 1, wherein said script analyzing and executing section has means for temporarily storing a plurality of parameters selected by a user inputting push buttons from said facsimile terminal, and executing a CGI program based on script which can be read from said computer browser via the WWW retrieval section, based on the stored plurality of parameters.

5. An image information retrieval system according to claim 4, wherein said voice guidance information comprises: a description for assigning a voice file, and a description for showing the content or the guidance information as a text character string, and said speech synthesizing section has text speech synthesizing means for converting a text character string to voice, and said text speech synthesizing means extracts guidance information written in service control script, speech synthesizes a text character string written in the contents of said guidance information, and converts this to audio information for output to a facsimile terminal via said control section.

6. An image information retrieval system according to claim 1, further comprising means for executing instructions for retrieval of image information in said HTML file at regular intervals based on primary storage position information.

7. An image information retrieval system according to claim 1, further comprising directory information creating and storing means for analyzing, when secondary service control information and image label information written with a contents classification for relevant image information is included in the image information in said HTML file, the storage position of said image label information, and based on the analysis results, creating and storing directory information corresponding to said secondary service control information.

8. An image information retrieval system according to claim 7, further comprising means for outputting said directory information as to said guidance information.

9. An image information retrieval system according to claim 7, further comprising means for obtaining autonomously retrieved image information to obtain said image label information, and means for creating and storing directory information based on image label information obtained by said means for obtaining autonomously retrieved image information.

10. A method for retrieving an image information comprising:
controlling response at the time of line connection of a facsimile terminal, to output guidance information which is voice information to a user, to analyze push button signals which a user inputs with a push button, and to output image information to a facsimile terminal;
retrieving data on the WWW server using a URL address, to obtain the appropriate HTML file, a URL address/number converting section which converts a specified number to a URL address;
appending a number to a URL address extracted by said URL address/number converting section, and to a URL address already registered therein, and stores them;
analyzing the HTML file obtained by said WWW retrieving section and converts the HTML to image data to be sent out to facsimile terminals;
analyzing and executing service control script written in one part of an HTML file;
converting voice guidance information written in said analyzed service control script to audio information which can be output to facsimile terminals;
controlling said circuit control section, said WWW retrieving section, said URL address/number converting section, said HTML file/image converting section, and said script analyzing and executing section,
wherein said control section outputs, upon like connection of said facsimile terminal, guidance information to said facsimile terminal via said line control section according to the service procedure indicated by a primary service control information, and
when said user specifies a number corresponding to a URL address for desired data on the WWW using push button input from said facsimile terminal, converts said number to a URL address using said URL address/number converting section, and executes retrieval of data on the WWW by means of said WWW retrieval section, and executes extraction of service control script from the HTML file of said retrieved data, and
in the case where there is no service control script, converts the HTML file to image information by means of said HTML file/image converting section and then outputs to the facsimile terminal via said line control section, or conveys the fact that there is no service control script to be executed to the facsimile terminal via said line control section by voice information or image information, and
in the case where there is service control script, outputs the guidance information to said facsimile terminal via said line control section in accordance with a service control command in said service control script, and when a user executes push button input from said facsimile terminal in accordance with said guidance information, executes retrieval of data on the WWW via said WWW retrieval section in accordance with the input contents, and converts the HTML file of said retrieved data to image information via said HTML file/image converting section, and then executes control to output to a facsimile terminal via said line control section.

11. A recording medium on which is recorded a program for executing:
a process for controlling response at the time of line connection of a facsimile terminal, to output guidance information which is voice information to a user, to analyze push button signals which a user inputs with a push button, and to output image information to a facsimile terminal;
a process for retrieving data on the WWW server using a URL address, to obtain the appropriate HTML file, a URL address/number converting section which converts a specified number to a URL address;
a process for appending a number to a URL address extracted by said URL address/number converting section, and to a URL address already registered therein, and stores them;
a process for analyzing the HTML file obtained by said WWW retrieving section and converts the HTML to image data to be sent out to facsimile terminals;
a process for analyzing and executing service control script written in one part of an HTML file;
a process for converting voice guidance information written in said analyzed service control script to audio information which can be output to facsimile terminals;
a process for controlling said circuit control section, said WWW retrieving section, said URL address/number converting section, said HTML file/image converting section, and said script analyzing and executing section,
wherein said control section outputs, upon like connection of said facsimile terminal, guidance information to said facsimile terminal via said line control section according to the service procedure indicated by a primary service control information, and
when said user specifies a number corresponding to a URL address for desired data on the WWW using push button input from said facsimile terminal, converts said number to a URL address using said URL address/number converting section, and executes retrieval of data on the WWW by means of said WWW retrieval section, and executes extraction of service control script from the HTML file of said retrieved data, and
in the case where there is no service control script, converts the HTML file to image information by means of said HTML file/image converting section and then outputs to the facsimile terminal via said line control section, or conveys the fact that there is no service control script to be executed to the facsimile terminal via said line control section by voice information or image information, and in the case where there is service control script, outputs the guidance information to said facsimile terminal via said line control section in accordance with a service control command in said service control script, and when a user executes push button input from said facsimile terminal in accordance with said guidance information, executes retrieval of data on the WWW via said WWW retrieval section in accordance with the input contents, and converts the HTML file of said retrieved data to image information via said HTML file/image converting section, and then executes control to output to a facsimile terminal via said line control section.

* * * * *